United States Patent
Chen et al.

(10) Patent No.: US 10,218,561 B2
(45) Date of Patent: Feb. 26, 2019

(54) COMMUNICATIONS SYSTEM, CONTROL APPARATUS, AND NETWORK MANAGEMENT SERVER

(71) Applicant: Huawei Technologies Co., Ltd., Shenzhen (CN)

(72) Inventors: Shengxian Chen, Shanghai (CN); Zhichang Lai, Shanghai (CN); Ziqiang Wang, Shanghai (CN); Wenli Cao, Shanghai (CN); Tao Liu, Shanghai (CN); Wei Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 15/077,429

(22) Filed: Mar. 22, 2016

(65) Prior Publication Data
US 2016/0204974 A1 Jul. 14, 2016

Related U.S. Application Data

(63) Continuation of application No. PCT/CN2013/083995, filed on Sep. 23, 2013.

(51) Int. Cl.
*H04L 12/12* (2006.01)
*H04L 12/24* (2006.01)
*H04L 12/66* (2006.01)
*H04L 29/12* (2006.01)

(52) U.S. Cl.
CPC ............ *H04L 41/044* (2013.01); *H04L 12/12* (2013.01); *H04L 12/66* (2013.01); *H04L 61/2015* (2013.01)

(58) Field of Classification Search
CPC . H04L 41/044; H04L 41/0803; H04L 63/101; H04L 12/66; H04L 12/12
See application file for complete search history.

(56) References Cited

U.S. PATENT DOCUMENTS

| 2003/0171118 | A1 | 9/2003 | Miya |
| 2004/0004943 | A1 | 1/2004 | Kim et al. |
| 2005/0229241 | A1 | 10/2005 | Carwile et al. |
| 2006/0235956 | A1* | 10/2006 | Kawaguchi ............. G06F 21/10 709/223 |

(Continued)

FOREIGN PATENT DOCUMENTS

| CN | 1464666 A | 12/2003 |
| CN | 1863365 A | 11/2006 |

(Continued)

*Primary Examiner* — Raj Jain
(74) *Attorney, Agent, or Firm* — Slater Matsil, LLP

(57) ABSTRACT

Embodiments of the disclosure describe a communications system, including: a control apparatus, multiple remote apparatuses, and a network management server, where the control apparatus communicates with and connects to the multiple remote apparatuses, and the control apparatus controls data aggregation and distribution of the multiple remote apparatuses; the control apparatus communicates with and connects to the network management server, and the network management server and the control apparatus transmit management data and feedback data according to a preset solution, so that the control apparatus and the multiple remote apparatuses are presented as only one network element on the network management server.

21 Claims, 15 Drawing Sheets

(56) References Cited

U.S. PATENT DOCUMENTS

| | | | |
|---|---|---|---|
| 2006/0293029 A1* | 12/2006 | Jha | H04M 1/72522 455/411 |
| 2007/0027920 A1 | 2/2007 | Alvarado et al. | |
| 2007/0263613 A1* | 11/2007 | Hara | H04L 12/66 370/356 |
| 2008/0155647 A1* | 6/2008 | Miyawaki | H04L 63/0227 726/1 |
| 2012/0303779 A1* | 11/2012 | Lee | H04L 41/0893 709/223 |
| 2013/0242720 A1 | 9/2013 | Chou | |
| 2014/0040444 A1* | 2/2014 | Lee | H04L 41/0806 709/222 |
| 2016/0204974 A1* | 7/2016 | Chen | H04L 41/044 709/223 |

FOREIGN PATENT DOCUMENTS

| | | | |
|---|---|---|---|
| CN | 1926898 A | 3/2007 | |
| CN | 101257696 A | 9/2008 | |
| CN | 100452900 C | 1/2009 | |
| EP | 1739988 A1 | 1/2007 | |
| WO | 02102109 A1 | 12/2002 | |

\* cited by examiner

COMMUNICATIONS SYSTEM, CONTROL APPARATUS, AND NETWORK MANAGEMENT SERVER

This application is a continuation of International Application No. PCT/CN2013/083995, filed on Sep. 23, 2013, which is hereby incorporated by reference in its entirety.

TECHNICAL FIELD

The present invention relates to the field of communications technologies, and in particular, to a communications system, a control apparatus, and a network management server.

BACKGROUND

As services increase, an increasingly higher requirement is imposed on a network capacity. In the prior art, low-power base stations, that is, small-cell base stations, are generally deployed in coverage of an existing macro base station to enhance a capacity and the coverage. These small-cell base stations and the macro base station form a heterogeneous network to maximize an access capacity, optimize user experience, and reduce costs.

The small-cell base stations may be deployed in different positions, for example, deployed in positions such as a traffic light, a street light, a utility pole, and a building side in a commercial street and a square. Due to diversity of deployment positions of the small-cell base stations, multiple transmission technologies need to be deployed to adapt to various deployment scenarios. The multiple transmission technologies include various wired transmission technologies and wireless transmission technologies.

In a process of studying and practicing the prior art, the inventor finds that the capacity can be enhanced indeed by deploying independent small-cell base stations. However, a large number of independent small-cell base stations need to be deployed, and the macro base station and the small-cell base stations communicate with a gateway device and a network management server separately. As a result, many new network elements are added on a network management server side, and communication and management become extremely complex.

SUMMARY

A communications system provided in embodiments of the present disclosure can enable many macro base stations and small-cell base stations to be presented as only one network element on a network management server side, thereby reducing complexity of network communication and management. The embodiments further provide a corresponding control apparatus and network management server.

A first aspect of the present embodiments provide a communications system, including a control apparatus, multiple remote apparatuses, and a network management server, where:

the control apparatus communicates with and connects to the multiple remote apparatuses, and the control apparatus controls data aggregation and distribution of the multiple remote apparatuses;

the control apparatus communicates with and connects to the network management server; and the network management server and the control apparatus transmit management data and feedback data according to a preset solution, so that the control apparatus and the multiple remote apparatuses are presented as only one network element on the network management server.

With reference to the first aspect, in a first possible implementation manner, coverage ranges of the multiple remote apparatuses are different in size, a remote apparatus with a coverage range greater than or equal to a specified value in the multiple remote apparatuses can provide a coverage range of a large cell, and a remote apparatus with a coverage range less than the specified value in the multiple remote apparatuses can provide a coverage range of a small cell;

the large cell is a cell with a signal range greater than or equal to the specified value; and the small cell is a cell with a signal range less than the specified value.

With reference to the first aspect or the first possible implementation manner of the first aspect, in a second possible implementation manner, that the network management server and the control apparatus transmit management data and feedback data according to a preset solution, so that the control apparatus and the multiple remote apparatuses are presented as only one network element on the network management server includes that:

the control apparatus has an interface paired with the network management server, and the control apparatus has an interface paired with each of the multiple remote apparatuses; and the control apparatus receives, by using the interface paired with the network management server, management data sent by the network management server, and distributes the management data to the multiple remote apparatuses by using the interface paired with each of the multiple remote apparatuses; the control apparatus receives, by using the interface paired with each of the multiple remote apparatuses, feedback data that is sent by the multiple remote apparatuses to the network management server, and sends, by using the interface paired with the network management server, the feedback data and feedback data generated by the control apparatus to the network management server, so that the network management server presents the control apparatus and the multiple remote apparatuses controlled by the control apparatus as one network element.

With reference to the first aspect or the first possible implementation manner of the first aspect, in a third possible implementation manner, that the network management server and the control apparatus transmit management data and feedback data according to a preset solution, so that the control apparatus and the multiple remote apparatuses are presented as only one network element on the network management server includes that:

the control apparatus and each of the multiple remote apparatuses have an interface paired with the network management server, and the multiple remote apparatuses communicate with and connect to the network management server;

the network management server sends management data to the control apparatus by using an interface paired with the control apparatus, and receives, by using the interface paired with the control apparatus, feedback data fed back by the control apparatus;

the network management server separately sends management data to the multiple remote apparatuses by separately using an interface paired with each of the multiple remote apparatuses, and receives, by using the interface paired with each of the multiple remote apparatuses, feedback data fed back by the multiple remote apparatuses; and the network management server presents the control apparatus and the multiple remote apparatuses controlled by the control apparatus as one network element.

With reference to the first aspect or the first possible implementation manner of the first aspect, in a fourth possible implementation manner, that the network management server and the control apparatus transmit management data and feedback data according to a preset solution, so that the control apparatus and the multiple remote apparatuses are presented as only one network element on the network management server includes that:

the control apparatus has an interface paired with the network management server, and each of a part of the multiple remote apparatuses has an interface paired with the network management server, where the part of the remote apparatuses communicate with and connect to the network management server;

the control apparatus receives, by using the interface paired with the network management server, management data sent by the network management server, distributes the management data to a remote apparatus that is in the multiple remote apparatuses and has no interface paired with the network management server, receives feedback data sent by the remote apparatus that has no interface paired with the network management server, and sends, by using the interface paired with the network management server, the feedback data and feedback data generated by the control apparatus to the network management server;

the network management server separately sends the management data to the part of the remote apparatuses by separately using an interface paired with each of the part of the remote apparatuses, and receives, by using the interface paired with each of the part of the remote apparatuses, feedback data fed back by the part of the remote apparatuses; and the network management server presents the control apparatus and the multiple remote apparatuses controlled by the control apparatus as one network element.

With reference to the first aspect and any one of the first possible implementation manner to the fourth possible implementation manner of the first aspect, in a fifth possible implementation manner, a radio access network RAN interface is used by the control apparatus and the multiple remote apparatuses, where the RAN interface includes an S1 interface, an X2 interface, an Iub interface, an Abis interface, and a WiFi Capwap interface.

With reference to the first aspect and any one of the first possible implementation manner to the fifth possible implementation manner of the first aspect, in a sixth possible implementation manner, data transmitted between the control apparatus and the multiple remote apparatuses is transmitted over a transmission link which is based on Ethernet, the Internet Protocol (IP), or Multiprotocol Label Switching (MPLS).

With reference to the first aspect and any one of the first possible implementation manner to the sixth possible implementation manner of the first aspect, in a seventh possible implementation manner, the number of remote apparatuses in the base station can be dynamically deployed according to a network capacity requirement.

With reference to the first aspect and any one of the first possible implementation manner to the seventh possible implementation manner of the first aspect, in an eighth possible implementation manner, the control apparatus is configured to manage the multiple remote apparatuses and transmission links between the control apparatus and the multiple remote apparatuses, and communicate with the network management device.

With reference to the first aspect and any one of the first possible implementation manner to the eighth possible implementation manner of the first aspect, in a ninth possible implementation manner, the control apparatus is an independent baseband unit or a baseband unit in a macro base station.

With reference to the first aspect and any one of the first possible implementation manner to the ninth possible implementation manner of the first aspect, in a tenth possible implementation manner, the control apparatus supports an Ethernet, IP, or MPLS interface, and multiple transmission technologies, where the multiple transmission technologies include wired transmission and wireless transmission.

With reference to the tenth possible implementation manner of the first aspect, in an eleventh possible implementation manner, the wired transmission includes an x passive optical network xPON, an x digital subscriber line xDSL, Ethernet, an optical fiber, and a cable television network Cable.

The wireless transmission includes microwave in a conventional frequency band, V-band V-Band, E-band E-Band, Sub 6 GHz, Wireless Fidelity WiFi, television white spaces (TV white spaces), and time division duplex TDD backhaul.

With reference to the first aspect and any one of the first possible implementation manner to the eleventh possible implementation manner of the first aspect, in a twelfth possible implementation manner, the remote apparatus is at least one of the following small-cell base stations: Metrocell, Micro, Pico, Femto, and WiFi AP.

With reference to the first aspect and any one of the first possible implementation manner to the twelfth possible implementation manner of the first aspect, in a thirteenth possible implementation manner, the control apparatus and the remote apparatus are of a single standard or in multimode.

The single standard includes a Global System for Mobile Communications GSM, a Universal Mobile Telecommunications System UMTS, Long Term Evolution LTE, and WiFi; and the multi-mode is a combination of single standards, where the combination of single standards includes at least two of the following: GSM, UMTS, WiFi, and LTE.

With reference to the first aspect and any one of the first possible implementation manner to the thirteenth possible implementation manner of the first aspect, in a fourteenth possible implementation manner, the control apparatus supports an Ethernet, IP, or MPLS interface, and multiple transmission technologies, where the multiple transmission technologies include wired transmission and wireless transmission.

With reference to the fourth possible implementation manner of the first aspect, in a fifteenth possible implementation manner, a remote apparatus that provides a small cell and is in the multiple remote apparatuses is arranged in a coverage range of a large cell or on the edge of a coverage range of a large cell.

With reference to the first aspect and any one of the first possible implementation manner to the fifteenth possible implementation manner of the first aspect, in a sixteenth possible implementation manner, the control apparatus discovers, by using the Dynamic Host Configuration Protocol DHCP of address autoconfiguration, a remote apparatus connected to the control apparatus.

With reference to the first aspect and any one of the first possible implementation manner to the sixteenth possible implementation manner of the first aspect, in a seventeenth possible implementation manner, the control apparatus queries the remote apparatus by using pre-configured information about remote apparatuses associated with the control apparatus.

With reference to the first aspect and any one of the first possible implementation manner to the seventeenth possible implementation manner of the first aspect, in an eighteenth possible implementation manner, the control apparatus obtains configuration information of the multiple remote apparatuses from the network management server and performs configuration for the multiple remote apparatuses.

With reference to the first aspect and any one of the first possible implementation manner to the eighteenth possible implementation manner of the first aspect, in a nineteenth possible implementation manner, the control apparatus has at least one of the following functions: a data proxy function or a data gateway function.

With reference to the first aspect and any one of the first possible implementation manner to the nineteenth possible implementation manner of the first aspect, in a twentieth possible implementation manner, the communications system further includes a gateway device.

The control apparatus receives uplink data that is sent by the multiple remote apparatuses to the gateway device, and sends the uplink data to the gateway device by using an interface paired with the gateway device; and the control apparatus receives, by using the interface, downlink data sent by the gateway device, and distributes the downlink data to the multiple remote apparatuses, so that the control apparatus and the multiple remote apparatuses are presented as only one network element on the gateway device.

A second aspect of the present embodiments provide a communications system, including a control apparatus and multiple remote apparatuses, where:

the control apparatus communicates with and connects to the multiple remote apparatuses, and the control apparatus controls data aggregation and distribution of the multiple remote apparatuses, so that the control apparatus and the multiple remote apparatuses are presented as only one network element on the network management server and a gateway device that are outside the communications system.

A third aspect of the present embodiments provide a control apparatus, where the control apparatus has an interface paired with a network management server, and the control apparatus has an interface paired with each of a multiple remote apparatuses; and the control apparatus includes:

a first receiving unit, configured to receive, by using the interface paired with the network management server, management data sent by the network management server; and a first sending unit, configured to distribute, by using the interface paired with each of the multiple remote apparatuses, the management data received by the first receiving unit to the multiple remote apparatuses, where the first receiving unit is further configured to receive feedback data that is sent by the multiple remote apparatuses to the network management server by using the interface paired with each of the multiple remote apparatuses; and the first sending unit is configured to send, by using the interface paired with the network management server, the feedback data and feedback data generated by the control apparatus to the network management server, so that the network management server presents the control apparatus and the multiple remote apparatuses controlled by the control apparatus as one network element.

With reference to the third aspect, in a first possible implementation manner, the control apparatus and each of the multiple remote apparatuses have an interface paired with the network management server, and the multiple remote apparatuses communicate with and connect to the network management server;

the control apparatus includes:

a second receiving unit, configured to receive, by using the interface paired with the network management server, management data sent by the network management server; and a second sending unit, configured to send feedback data of the control apparatus to the network management server by using the interface paired with the network management server; and the remote apparatus includes:

a third receiving unit, configured to receive, by using the interface paired with the network management server, management data sent by the network management server; and a third sending unit, configured to send feedback data of the control apparatus to the network management server by using the interface paired with the network management server, so that the network management server presents the control apparatus and the multiple remote apparatuses controlled by the control apparatus as one network element.

A fourth aspect of the present embodiments provide a network management server, where the network management server and a control apparatus transmit management data and feedback data according to a preset solution, so that the control apparatus and a multiple remote apparatuses are presented as only one network element of a base station on the network management server;

the control apparatus communicates with and connects to the multiple remote apparatuses, and the control apparatus controls data aggregation and distribution of the multiple remote apparatuses; and the control apparatus communicates with and connects to the network management server.

With reference to the fourth aspect, in a first possible implementation manner, the control apparatus has an interface paired with the network management server; and the network management server includes:

a first sending unit, configured to send management data to the control apparatus by using an interface paired with the control apparatus;

a first receiving unit, configured to receive, by using the interface paired with the control apparatus, feedback data of the multiple remote apparatuses and feedback data of the control apparatus that are sent by the control apparatus; and a first determining unit, configured to present the control apparatus and the multiple remote apparatuses controlled by the control apparatus as one network element.

With reference to the fourth aspect, in a second possible implementation manner, the control apparatus and each of the multiple remote apparatuses have an interface paired with the network management server; and the network management server includes:

a second sending unit, configured to send management data to the control apparatus by using an interface paired with the control apparatus, and send the management data to the multiple remote apparatuses by using an interface paired with each of the multiple remote apparatuses;

a second receiving unit, configured to receive, by using the interface paired with the control apparatus, feedback data fed back by the control apparatus and receive, by using the interface paired with each of the multiple remote apparatuses, feedback data fed back by the multiple remote apparatuses; and a second determining unit, configured to present the control apparatus and the multiple remote apparatuses controlled by the control apparatus as one network element.

A fifth aspect of the present embodiments provide a control apparatus, where the control apparatus communicates with and connects to a multiple remote apparatuses, and the control apparatus controls data aggregation and distribution of the multiple remote apparatuses;

the control apparatus communicates with and connects to a network management server;

the control apparatus includes an input device, an output device, a processor, and a memory; and the processor is configured to transmit management data and feedback data according to a preset solution, so that the control apparatus and the multiple remote apparatuses are presented as only one network element on the network management server.

A sixth aspect of the present embodiments provide a network management server, including an input device, an output device, a processor, and a memory, where:

the output device is configured to send management data to a control apparatus and/or multiple remote apparatuses;

the input device is configured to receive feedback data sent by the control apparatus and/or the multiple remote apparatuses; and the processor is configured to present the control apparatus and the multiple remote apparatuses controlled by the control apparatus as one network element.

A communications system provided in the embodiments includes: a control apparatus, multiple remote apparatuses, and a network management server, where the control apparatus communicates with and connects to the multiple remote apparatuses, and the control apparatus controls data aggregation and distribution of the multiple remote apparatuses; the control apparatus communicates with and connects to the network management server, and the network management server and the control apparatus transmit management data and feedback data according to a preset solution, so that the control apparatus and the multiple remote apparatuses are presented as only one network element on the network management server. Compared with the prior art in which many small-cell base stations are independently presented on a network management server side, the communications system provided in the embodiments can enable many macro base stations and small-cell base stations to be presented as only one network element on the network management server side, thereby reducing complexity of network communication and management.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show merely some embodiments, and persons skilled in the art may still derive other drawings from these accompanying drawings without creative efforts.

DETAILED DESCRIPTION OF ILLUSTRATIVE EMBODIMENTS

Figure 1:
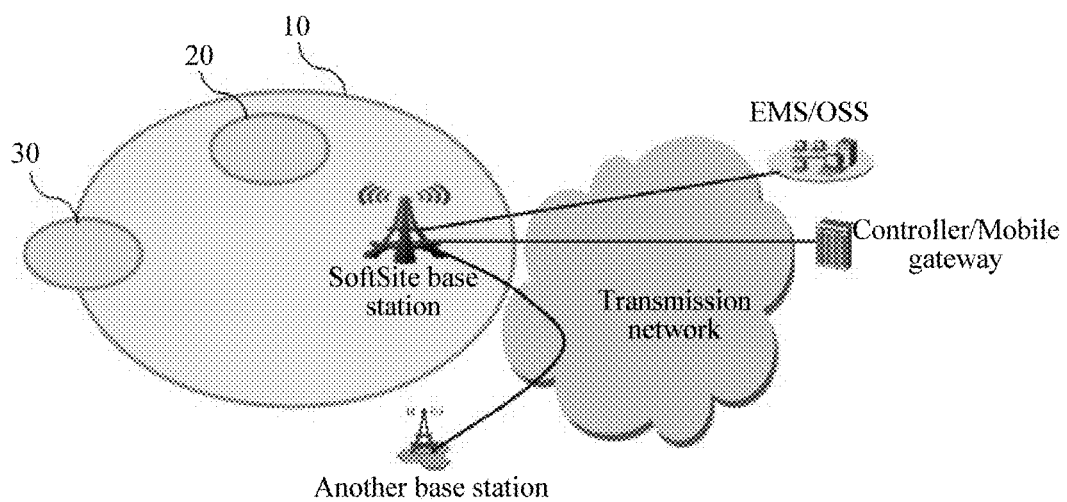
FIG. 1 is a schematic diagram of an embodiment of a communications system according to an embodiment.

A communications system provided in the embodiments can enable many macro base stations and small-cell base stations to be presented as only one network element on a network management server side, thereby reducing complexity of network communication and management. The embodiments further provide a corresponding control apparatus and network management server, which are described separately in detail in the following.

The following clearly describes the technical solutions in the embodiments with reference to the accompanying drawings in the embodiments. Apparently, the described embodiments are merely a part of rather than all of the embodiments. All other embodiments obtained by persons skilled in the art based on the embodiments without creative efforts shall fall within the protection scope of the present disclosure.

A communications system provided in an embodiment includes a control apparatus, multiple remote apparatuses, and a network management server, where:

a base station includes the control apparatus and the multiple remote apparatuses, where the control apparatus communicates with and connects to the multiple remote apparatuses, and the control apparatus controls data aggregation and distribution of the multiple remote apparatuses;

the control apparatus communicates with and connects to the network management server; and the network management server and the control apparatus transmit management data and feedback data according to a preset solution, so that the control apparatus and the multiple remote apparatuses are presented as only one network element on the network management server.

Optionally, on the basis of the foregoing embodiment, in another embodiment of the communications system provided in this embodiment, coverage ranges of the multiple remote apparatuses are different in size, a remote apparatus with a coverage range greater than or equal to a specified value in the multiple remote apparatuses can provide a coverage range of a large cell, and a remote apparatus with a coverage range less than the specified value in the multiple remote apparatuses can provide a coverage range of a small cell;

the large cell is a cell with a signal range greater than or equal to the specified value; and the small cell is a cell with a signal range less than the specified value.

The specified value is subject to a coverage range provided by a macro base station.

For example, the specified value may be subject to a coverage range of a base station with 4 w output power, where a large cell is greater than or equal to 4 W, and a small cell is less than 4 W.

Optionally, on the basis of the foregoing embodiment, in another embodiment of the communications system provided in this embodiment, that the network management server and the control apparatus transmit management data and feedback data according to a preset solution, so that the control apparatus and the multiple remote apparatuses are presented as only one network element on the network management server includes that:

the control apparatus has an interface paired with the network management server, and the control apparatus has an interface paired with each of the multiple remote apparatuses; and the control apparatus receives, by using the interface paired with the network management server, management data sent by the network management server, and distributes the management data to the multiple remote apparatuses by using the interface paired with each of the multiple remote apparatuses; the control apparatus receives, by using the interface paired with each of the multiple remote apparatuses, feedback data that is sent by the multiple remote apparatuses to the network management server, and sends, by using the interface paired with the network management server, the feedback data and feedback data generated by the control apparatus to the network management server, so that the network management server presents the control apparatus and the multiple remote apparatuses controlled by the control apparatus as one network element.

Optionally, on the basis of the foregoing embodiment, in another embodiment of the communications system provided in this embodiment, that the network management server and the control apparatus transmit management data and feedback data according to a preset solution, so that the control apparatus and the multiple remote apparatuses are presented as only one network element on the network management server includes that:

the control apparatus and each of the multiple remote apparatuses have an interface paired with the network management server, and the multiple remote apparatuses communicate with and connect to the network management server;

the network management server sends management data to the control apparatus by using an interface paired with the control apparatus, and receives, by using the interface paired with the control apparatus, feedback data fed back by the control apparatus;

the network management server separately sends management data to the multiple remote apparatuses by separately using an interface paired with each of the multiple remote apparatuses, and receives, by using the interface paired with each of the multiple remote apparatuses, feedback data fed back by the multiple remote apparatuses; and the network management server presents the control apparatus and the multiple remote apparatuses controlled by the control apparatus as one network element.

Optionally, on the basis of the foregoing embodiment, in another embodiment of the communications system provided in this embodiment, that the network management server and the control apparatus transmit management data and feedback data according to a preset solution, so that the control apparatus and the multiple remote apparatuses are presented as only one network element on the network management server includes that:

the control apparatus has an interface paired with the network management server, and each of a part of the multiple remote apparatuses has an interface paired with the network management server, where the part of the remote apparatuses communicate with and connect to the network management server;

the control apparatus receives, by using the interface paired with the network management server, management data sent by the network management server, distributes the management data to a remote apparatus that is in the multiple remote apparatuses and has no interface paired with the network management server, receives feedback data sent by the remote apparatus that has no interface paired with the network management server, and sends, by using the interface paired with the network management server, the feedback data and feedback data generated by the control apparatus to the network management server;

the network management server separately sends the management data to the part of the remote apparatuses by separately using an interface paired with each of the part of the remote apparatuses, and receives, by using the interface paired with each of the part of the remote apparatuses, feedback data fed back by the part of the remote apparatuses; and the network management server presents the control apparatus and the multiple remote apparatuses controlled by the control apparatus as one network element.

A radio access network (RAN) interface is used by the control apparatus and the multiple remote apparatuses, where the RAN interface includes an S1 interface, an X2 interface, an Iub interface, an Abis interface, and a WiFi Capwap interface.

The control apparatus and the multiple remote apparatuses can separately provide at least one of the following: the S1 interface, the X2 interface, the Iub interface, the Abis interface, and the WiFi Capwap interface.

Data transmitted between the control apparatus and the multiple remote apparatuses is transmitted over a transmission link based on Ethernet, the Internet Protocol (IP), or Multiprotocol Label Switching (MPLS).

The number of remote apparatuses in the base station can be dynamically deployed according to a network capacity requirement. In this way, the number of remote apparatuses can be increased at any time, thereby enhancing a network capacity.

The control apparatus is configured to manage the multiple remote apparatuses and transmission links between the control apparatus and the multiple remote apparatuses, and communicate with a network management device.

The control apparatus is an independent baseband unit or a baseband unit in a macro base station.

The control apparatus supports an Ethernet, IP, or MPLS interface, and multiple transmission technologies, where the multiple transmission technologies include wired transmission and wireless transmission.

The wired transmission includes but is not limited to an x passive optical network (xPON), an x digital subscriber line (xDSL), Ethernet or an optical fiber, and a cable television network Cable.

The wireless transmission includes but is not limited to microwave in a conventional frequency band, V-band V-Band, E-band E-Band, Sub 6 GHz, Wireless Fidelity (WiFi), television white spaces (TV white spaces), and time division duplex (TDD) backhaul.

The remote apparatus is at least one of the following small-cell base stations: a metro (Metro) small-cell base station, a micro (Micro) small-cell base station, a pico (Pico) small-cell base station, a femto (Femto) small-cell base station, and a Wireless Fidelity access point (WiFi AP) small-cell base station.

The control apparatus and the remote apparatus are of a single standard or in multi-mode.

The single standard is a Global System for Mobile Communications (GSM), a Universal Mobile Telecommunications System (UMTS), Long Term Evolution (LTE), or WiFi.

The multi-mode is a combination of the foregoing single standards, including at least two of the following: GSM, UMTS, WiFi, and LTE.

The remote apparatus supports an Ethernet, IP, or MPLS interface, and multiple transmission technologies, where the multiple transmission technologies include wired transmission and wireless transmission.

A remote apparatus that provides a small cell and is in the multiple remote apparatuses is arranged in a coverage range of a large cell or on the edge of a coverage range of a large cell.

The control apparatus discovers, by using the Dynamic Host Configuration Protocol (DHCP) of address autoconfiguration, a remote apparatus connected to the control apparatus.

The control apparatus queries the remote apparatus by using pre-configured information about remote apparatuses associated with the control apparatus.

The control apparatus obtains configuration information of the multiple remote apparatuses from the network management server and performs configuration for the multiple remote apparatuses.

The control apparatus has at least one of the following functions: a data proxy function or a data gateway function.

The communications system further includes a gateway device.

The control apparatus receives uplink data that is sent by the multiple remote apparatuses to the gateway device, and sends the uplink data to the gateway device by using an interface paired with the gateway device; and the control apparatus receives, by using the interface, downlink data sent by the gateway device, and distributes the downlink data to the multiple remote apparatuses, so that the base station is presented as only one network element on the gateway device.

Referring to FIG. 1, an embodiment of a communications system provided in an embodiment includes:

a base station, where the base station is a softsite base station; a coverage range of the base station includes areas 10, 20, and 30, and the base station may communicate with an element management system (EMS) or an operations support system (OSS). In this embodiment, an EMS/OSS device may be collectively referred to as a network management server. The base station may further communicate with another base station, and the another base station may be a macro base station or a small-cell base station in the prior art, or the softsite base station in this embodiment. The base station may further communicate with a controller or a mobile gateway. It should be noted that in this embodiment, the areas 10, 20, and 30 included in the coverage range of the base station are only for exemplary description. In practice, the coverage range of the base station may include a large number of coverage areas and should not be limited to only these three coverage areas.

Figure 2:
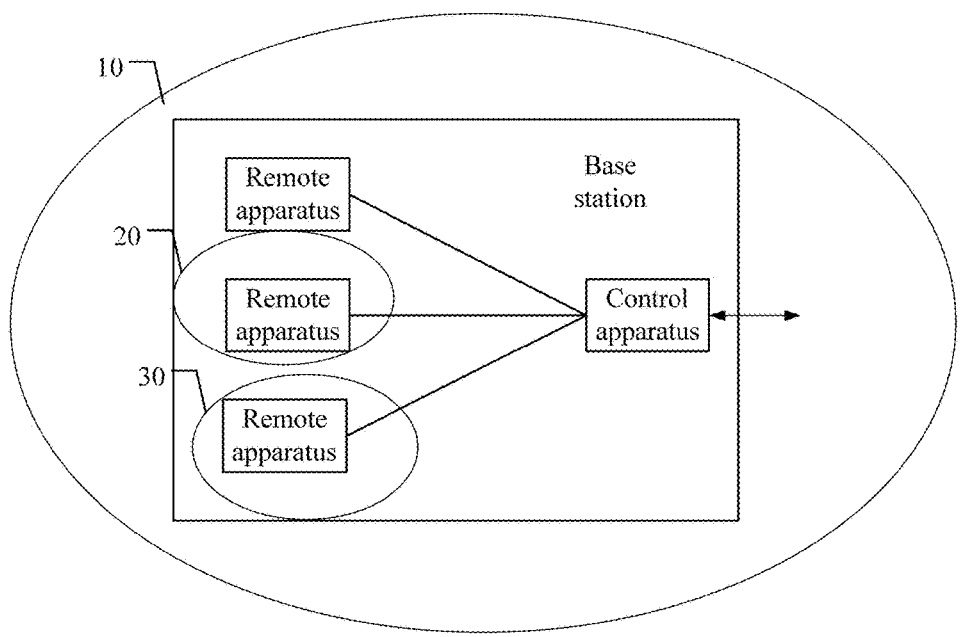
FIG. 2 is a schematic diagram of an embodiment of a base station according to an embodiment.

For the base station provided in this embodiment, refer to FIG. 2 for understanding. The base station may include a control apparatus and multiple remote apparatuses (which are not limited to three remote apparatuses shown in FIG. 2). A coverage range of each remote apparatus may be the same or different, for example, one coverage range is 10, and other coverage ranges are 20 and 30. The control apparatus controls each remote apparatus. When the remote apparatus communicates with another base station, a controller, or a gateway, the control apparatus needs to forward data. Similarly, conversely, the control apparatus also needs to forward data that is sent by another device to the remote apparatus.

Figure 3:
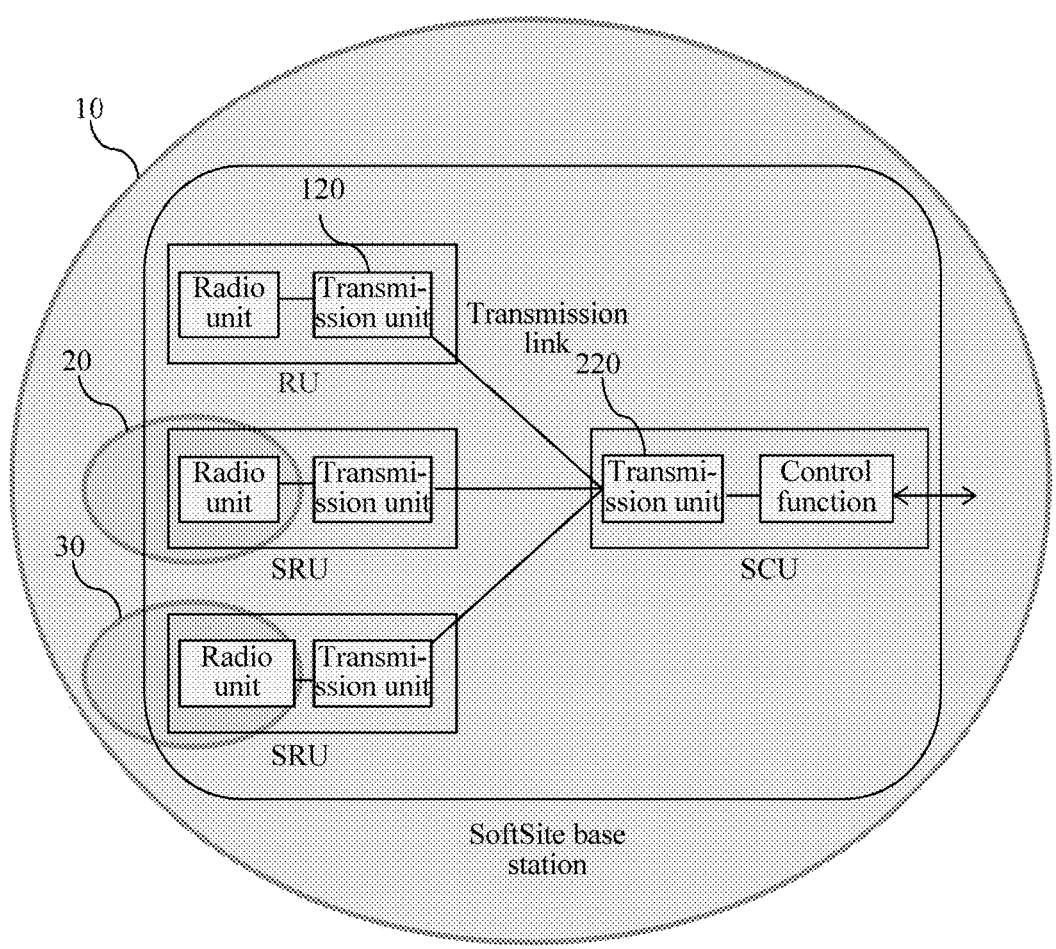
FIG. 3 is a schematic diagram of another embodiment of a base station according to an embodiment.

For the softsite base station, refer to FIG. 3 for understanding. The softsite base station includes:

a SoftSite control unit (SCU), a SoftSite remote unit (SRU), and a remote unit (RU), where the RU may be a macro base station, the SRU may be a small-cell base station, and there is a transmission link between the SCU and the SRU or the RU.

The RU is configured to provide a cell 10 with a large coverage range. The RU includes a radio unit and a transmission unit. The radio unit is configured to provide a radio cell and the transmission unit is configured to perform transmission and communication with the SCU. The RU herein may be implemented by reusing a function of an existing macro base station, for example, an RRU of the existing macro base station is used to implement the RU, so as to provide the cell 10 with the large coverage range.

The SRU is configured to provide a small cell with a small coverage range, such as small cells 20 and 30. The SRU includes a radio unit and a transmission unit. The radio unit is configured to provide a radio cell and the transmission unit is configured to perform transmission and communication with the SCU. The SRU herein only needs to provide the small cell with the small coverage range, and another type of base station that is different from the RRU may be used.

The radio unit of the SRU may be used as an independent base station, and in this case may be implemented by using a function of a small-cell base station, for example, by using various station-type small-cell base stations, such as a metro (Metro) small-cell base station, a micro (Micro) small-cell base station, a pico (Pico) small-cell base station, a femto (Femto) small-cell base station, and a Wireless Fidelity access point (WiFi AP) small-cell base station.

The radio unit of the SRU may also be divided by using the function of the base station and then be formed after being redistributed in the SRU. For example, an L1 protocol stack of the base station is implemented in the SRU and another protocol stack is implemented in the SCU.

The SRU may be of a single standard, such as the Global System for Mobile Communications (GSM), the Universal Mobile Telecommunications System (UMTS), and the Long Term Evolution (LTE); and the SRU may also be of a multi-mode, such as UMTS and WiFi, and LTE and WiFi.

The transmission unit in the SRU may be a reused transmission interface/board of an existing small-cell base station, or may be a newly-added network device.

The transmission unit in the SRU may support an Ethernet, Internet Protocol (IP), or Multiprotocol Label Switching (MPLS) interface, and may also support various transmission technologies, where the transmission technologies include wired transmission and wireless transmission. The wired transmission includes an x passive optical network (xPON), an x digital subscriber line (xDSL), Ethernet, and so on; and the wireless transmission includes microwave in a conventional frequency band, V-Band, E-Band, Sub 6 GHz, WiFi, television white spaces (TV white spaces), time division duplex (TDD) backhaul, and so on.

The SCU is configured to control and manage the RU/SRU and a transmission link between the SCU and the RU/SRU, and communicate with another network or network element. The SCU includes a control function module and a transmission unit 220. The control function module is configured to control and manage the RU/SRU, and communicate with another network/network element. The transmission unit 220 is configured to perform transmission and communication with the RU/SRU. A control function of the SCU may reuse the function of the existing macro base station, for example, a BBU is used to implement the control function. The existing macro base station may be a single-standard macro base station (such as GSM, UMTS, LTE, and CDMA), or may be a multi-mode macro base station (such as GSM and UMTS, and UMTS and LTE) or a SingleRAN base station. The transmission unit in the SCU may be a reused transmission interface/board of the existing macro base station, or may be a newly-added board/network device. The transmission unit in the SCU may support an Ethernet/IP/MPLS interface, and may also support various transmission technologies, where the transmission technologies include wired transmission and wireless transmission. The wired transmission includes xPON, xDSL, Ethernet/an optical fiber, a cable television network Cable, and so on; and the wireless transmission includes microwave in a conventional frequency band, V-band, E-band, Sub 6 GHz, WiFi, television white spaces (TV white spaces), TDD backhaul, and so on.

The transmission link between the SCU and the SRU/RU: The SCU communicates with the SRU/RU by using the transmission unit in the SRU/RU and the transmission unit in the SCU to provide a transmission link based on Ethernet/IP/MPLS.

Transmission technologies are not limited to optical transmission, and an optical fiber may not be required. The transmission technologies may include wired transmission and wireless transmission, or a hybrid wired and wireless transmission. The wired transmission includes xPON, xDSL, Ethernet/an optical fiber, a Cable, and so on; and the wireless transmission includes microwave in a conventional frequency band, V-Band, E-Band, Sub 6 GHz, WiFi, television white spaces (TV white spaces), TDD backhaul, and so on.

An RAN interface between the SCU and the SRU: The RAN interface used between the SCU and the SRU may be different from a CPRI and can be transmitted over a transmission link based on Ethernet/IP/MPLS.

The radio cell provided by the SoftSite base station: The SoftSite base station provides a radio service by using a cell, which includes at least one cell 10 with a large coverage range and one or more small cells covered by the cell 10 with the large coverage range.

The cell 10 with the large coverage range—large cell:

The large cell is used to provide a large radio coverage range and used to provide a basic radio coverage range/capacity.

For the large cell, a radio technology standard that provides a cell is not limited. For example, the radio technology standard may be UMTS, LTE, LTE-A, WiFi, and CDMA, which is not limited herein.

The large cell is provided by the RU, for example, the large cell may be a macro cell.

Small Cell:

The small cell is used to provide a small radio coverage range and used to provide an enhanced radio coverage range/capacity.

For the small cell, a radio technology standard that provides a cell is not limited. For example, the radio technology standard may be UMTS, LTE, LTE-A, WiFi, and CDMA, which is not limited herein.

The small cell is provided by the SRU.

For example, the small cell may be a femto cell, a Pico cell, a Micro cell, and a Metro cell, such as the small cells 20 and 30, and the number of small cells is not limited herein. The small cell may also be located on the edge of the cell 10 with the large coverage range, for example, the small cell 30 is located on the edge of the cell 10 with the large coverage range.

The base station provided in this embodiment can enhance a radio network capacity by deploying a unified group of small-cell base stations.

For ease of understanding, an example is used in the following, and the present embodiments are not limited to these connection systems, devices and methods.

For a gigabit-capable passive optical network (GPON), the transmission unit of the SRU is a GPON optical network unit (ONU), and the transmission unit of the SCU is a mini GPON optical line terminal (OLT). The transmission unit GPON ONU of the SRU connects to the transmission unit mini GPON OLT of the SCU.

For an xDSL network, the transmission unit of the SRU is an xDSL customer premise equipment (CPE), and the transmission unit of the SCU is a mini xDSL digital subscriber line access multiplexer (DSLAM). The transmission unit xDSL CPE of the SRU connects to the transmission unit mini xDSL DSLAM of the SCU.

For Ethernet, the transmission unit of the SRU is a transmission interface of the small-cell base station, and the transmission unit of the SCU is a transmission interface of a controller/gateway of the small-cell base station. The transmission unit of the SRU directly connects to the transmission unit of the SCU, or connects to the transmission unit of the SCU by using an Ethernet/IP network.

For the wireless transmission, the transmission unit of the SRU is a wireless transmission module of the small-cell base station, and the transmission unit of the SCU is a wireless transmission module of the controller/gateway of the small-cell base station. The transmission unit of the SRU directly connects to the transmission unit of the SCU, or connects to the transmission unit of the SCU by using a multi-hop radio network.

For a hybrid wired and wireless network the transmission unit of the SRU is a wired/wireless transmission module of the small-cell base station, and the transmission unit of the SCU is a wired/wireless transmission module of the controller/gateway of the small-cell base station. The transmission unit of the SRU directly connects to the transmission unit of the SCU, or connects to the transmission unit of the SCU by using an intermediate network.

The SRU performs a radio service, and a UE in a hotspot area gains access to the SRU. The SCU transforms multiple small cells (Small Cell) into one or more cells with a large coverage range, thereby implementing spontaneous capacity expansion of the radio network.

In this embodiment, as a capacity requirement increases in a hotspot area, SRUs are increasingly deployed to enhance a radio network capacity. In addition, the SRU, an SCU, and a transmission link between the SRU and the SCU are considered as one base station. Therefore, single-point management can be performed, operation and maintenance are simplified, and rapid deployment is implemented by using a small-cell base station. In this way, a rapid and low-cost method for enhancing a radio network capacity is provided.

Figure 4:
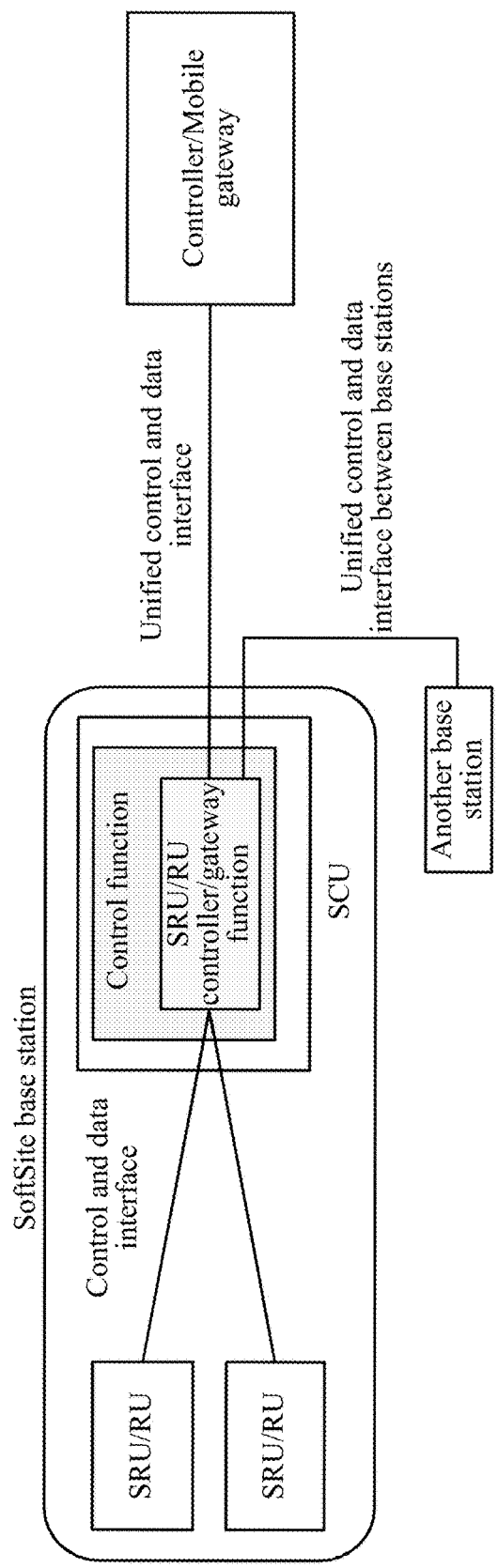
FIG. 4 is a schematic diagram of an embodiment of a communications system according to an embodiment.

Referring to FIG. 4, in this embodiment, the SCU further has a controller function or a gateway function of the SRU and the RU.

A method for controlling an interface between the SRU/RU and a controller or a mobile gateway includes:

adding the controller function or the gateway function of the SRU and the RU to the control function of the SCU, where the controller function or the gateway function of the SRU and the RU includes at least a control function of a control and data interface.

The control function of the control and data interface can aggregate and convert one or more control and data interfaces between the SRU and the controller or the mobile gateway into a unified control and data interface, and then the SRU connects to the controller/mobile gateway by using the unified control and data interface.

For example, the control function of the control and data interface may be implemented by using a home NodeB gateway (HNB GW), home eNodeB gateway (HeNB GW), a WiFi AC/controller, an LTE Small Cell GW, or the like, or a combination of a home NodeB gateway, a WiFi AC/controller, and an LTE Small Cell GW.

An existing control and data interface of the SCU may be reused as the unified control and data interface with the controller/mobile gateway, or a control and data interface with the controller/mobile gateway is newly established based on an existing control and data interface.

An implementation method for reusing the existing control and data interface of the SCU is as follows:

A control and data interface between one or more SRUs and the controller/mobile gateway is reused as a unified control and data interface that is the same as the control and data interface of the SCU.

For ease of understanding, an example is used in the following, and is not limited to these interfaces.

The SRU provides an S1 interface, where multiple SRUs connect to the SCU by using S1 interfaces. The SCU already has an S1 interface, then the SCU aggregates the S1 interfaces of the multiple SRUs into a unified S1 interface, and the SCU connects to the controller/mobile gateway by using the unified S1 interface. The SRU provides an Iub interface, where the multiple SRUs connect to the SCU by using the Iub interface. The SCU already has an Iub interface, then the SCU aggregates the Iub interface of the multiple SRUs into a unified Iub interface, and the SCU connects to the controller/mobile gateway by using the unified Iub interface.

The SRU provides an Abis interface, where the multiple SRUs connect to the SCU by using Abis interfaces. The SCU already has an Abis interface, then the SCU aggregates the Abis interfaces of the multiple SRUs into a unified Abis interface, and the SCU connects to the controller/mobile gateway by using the unified Abis interface.

The SRU provides a WiFi Capwap interface, where the multiple SRUs connect to the SCU by using WiFi Capwap interfaces. The SCU already has a WiFi Capwap interface, then the SCU aggregates the WiFi Capwap interfaces of the multiple SRUs into a unified WiFi Capwap interface, and the SCU connects to the controller/mobile gateway by using the unified WiFi Capwap interface.

The control and data interface between the one or more SRUs and the controller/mobile gateway is reused as a unified control and data interface that is not the same as the control and data interface of the SCU.

For ease of understanding, an example is used in the following, and is not limited to these interfaces.

The SRU provides a WiFi Capwap interface, where multiple SRUs connect to the SCU by using WiFi Capwap interfaces. The SCU converts multiple WiFi Capwap interfaces into a unified 3GPP interface, such as a GTP interface, and then connects to the controller/mobile gateway by using the unified 3GPP interface, so as to facilitate integration of WiFi and a live network.

There are two methods for implementing the newly established control and data interface with the controller/mobile gateway.

When there is no available interface, the SCU needs to newly establish a control and data interface and connects to the controller/mobile gateway by using the newly established control and data interface. For example, the SCU is of an LTE standard, and the small-cell base station is of a UMTS standard. In this case, there is no available UMTS interface, then the SCU needs to newly establish a control and data interface of UMTS and connects to the controller/mobile gateway by using the newly established control and data interface of UMTS. In this case, the entire base station is considered as one multi-mode base station.

When there is an available interface, the SCU may also newly establish a control and data interface for load balancing/different QoS processing, and then connects to the controller/mobile gateway by using the newly established control and data interface. For example, the SCU establishes an independent control and data interface with a low QoS guarantee for the SRU, so as to guarantee a service priority of the SCU.

A method for controlling an interface with another base station:

A SCU with the controller/gateway function of the small-cell base station may also aggregate/convert one or more control and data interfaces between the SRU and the another base station into a unified control and data interface.

An existing control and data interface of the SCU may be reused as the unified control and data interface with the base station, or a control and data interface with the another base station is newly established based on an existing control and data interface.

An implementation method for reusing the existing control and data interface of the SCU is as follows:

A control and data interface between one or more SRUs and the another base station is reused as a unified control and data interface that is the same as the control and data interface of the SCU.

For ease of understanding, an example is used in the following, and is not limited to these interfaces.

The SRU provides an X2 interface, and multiple SRUs connect to the SCU. The SCU aggregates multiple X2 interfaces into a unified X2 interface and connects to another base station by using the unified X2 interface.

There are two methods for implementing the newly established control and data interface with the another base station.

When there is no available interface, the SCU needs to newly establish a control and data interface. For example, the SCU is of a UMTS standard, and the small-cell base station is of an LTE standard. In this case, there is no available X2 interface, the SCU needs to newly establish an X2 interface.

When there is an available interface, the SCU may also newly establish a control and data interface for load balancing/different QoS processing. For example, the SCU establishes an independent control and data interface with a low QoS guarantee for the SRU, so as to guarantee a service priority of the SCU.

Figure 5:
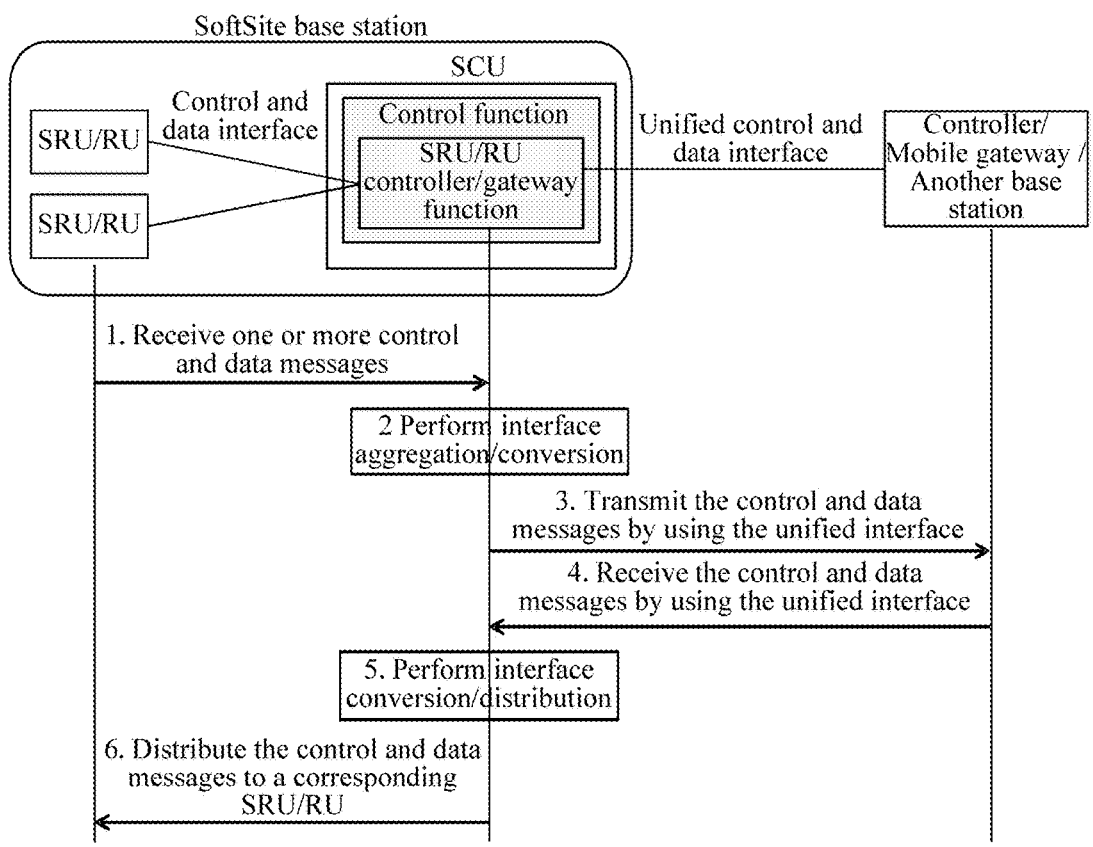
FIG. 5 is a schematic diagram of an embodiment of a communications system according to an embodiment.

Referring to FIG. 5, FIG. 5 is a process of aggregating or converting the control and data interface by the SCU in this embodiment.

A process of processing a message in a direction from the SRU or the RU to the controller/mobile gateway/another base station is as follows:

Step 1: The SCU receives one or more control and data messages from the SRU/RU.

Step 2: The control function of the SCU aggregates/converts the received one or more control and data messages into a unified control and data interface.

Step 3: The SCU transmits the control and data message received from the SRU/RU by using the unified control and data interface.

A process of processing a message in a direction from the controller/mobile gateway/another base station to the SRU/RU is as follows:

Step 4: The SCU receives a control and data message from the controller/mobile gateway/another base station by using the unified control and data interface.

Step 5: The control function of the SCU converts/distributes the received control and data message into/to the control and data interface of the SRU/RU.

Step 6: The SCU distributes the control and data message to a corresponding SRU/RU.

Figure 6:
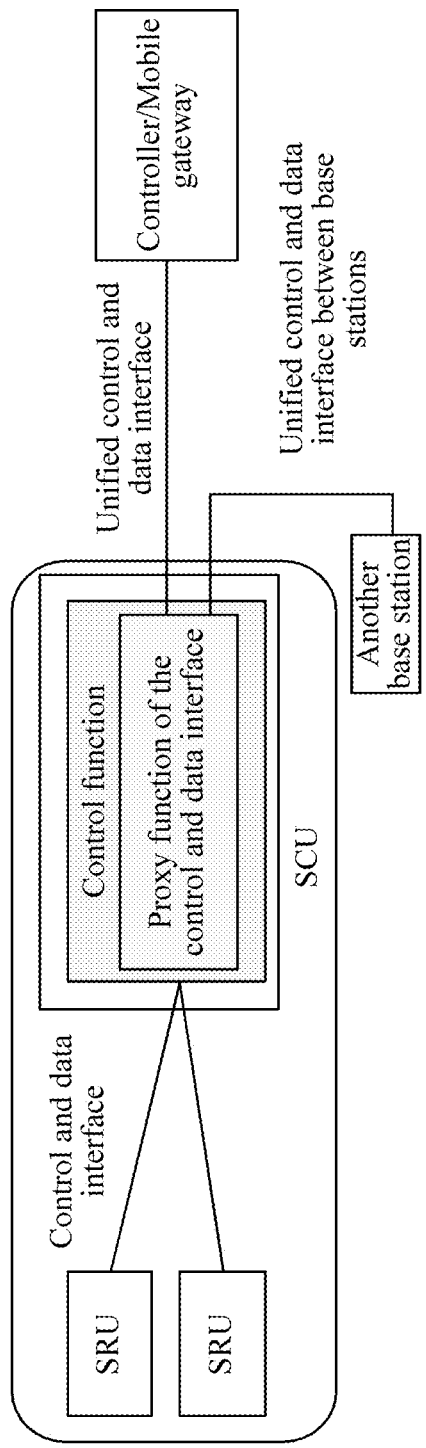
FIG. 6 is a schematic diagram of an embodiment of a communications system according to an embodiment.

Referring to FIG. 6, the SCU further has a proxy function of the control and data interface.

The proxy function of the control and data interface is added to the control function of the SCU to act as one or more control and data interfaces between the SRU and the controller/mobile gateway, and then the SCU provides a unified control and data interface for the controller/mobile gateway.

An existing control and data interface of the SCU may be reused as the unified control and data interface, or a control and data interface with the controller/mobile gateway is newly established based on an existing control and data interface.

Description of an implementation method for reusing the existing control and data interface of the SCU and description of a data aggregation or conversion process are the same as that of the SCU with the gateway function, and therefore no further details are provided in this embodiment.

In another embodiment of a communications system provided in an embodiment, the communications system may include a base station and a network management server, where the base station is the base station described in the foregoing embodiment. To present the base station as one device to the outside, several specific solutions may be adopted in this embodiment.

One of these solutions is an SCU-dominant solution: The SCU performs unified management on an SRU/RU, and a transmission link between the SCU and the SRU/RU.

Figure 7:
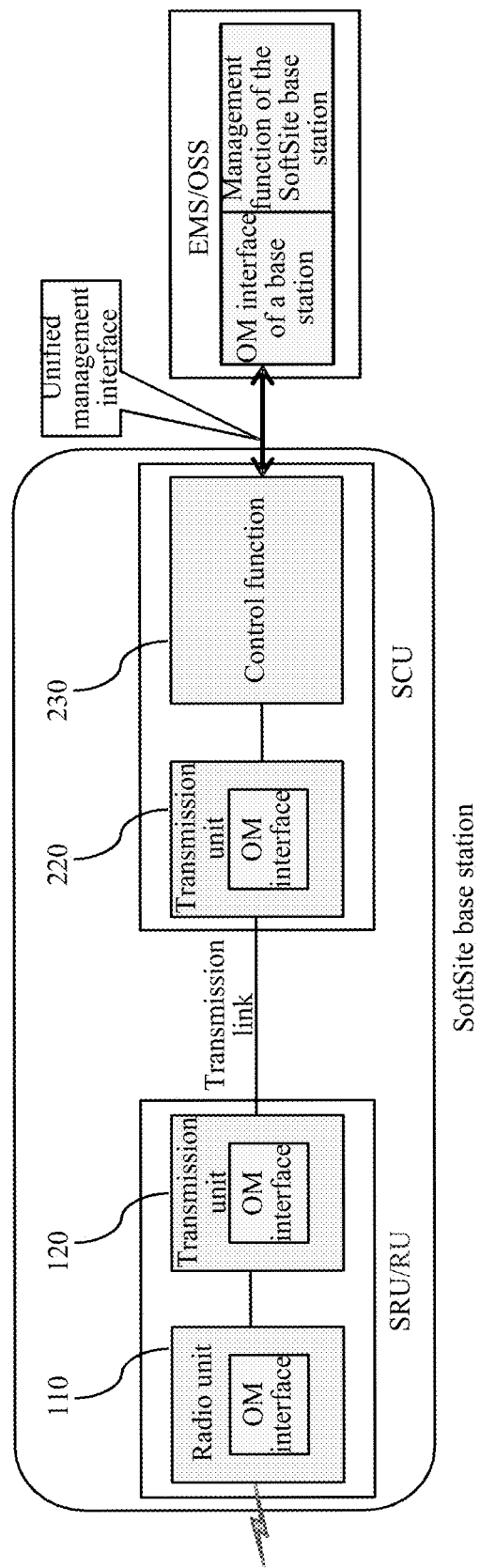
FIG. 7 is a schematic diagram of an embodiment of a communications system according to an embodiment.

Referring to FIG. 7, the network management server (EMS/OSS) has a management function of a SoftSite base station and an OM interface of the base station.

The management function of the SoftSite base station provides an operation, maintenance and management function for the SoftSite base station, such as configuration management, performance management, fault management, and software management.

The OM interface of the base station is used for management and communication between a management function module of the SoftSite base station and the SoftSite base station, and the management function module of the SoftSite base station performs operation, maintenance, and management on the SoftSite base station by using the OM interface of the base station.

A control function module of the SCU has a southbound OM interface, a northbound OM interface, and a management function module, where the southbound OM interface is used to perform management communication with the SRU/RU and a transmission unit of the SCU, and the northbound OM interface is used to perform management communication with the EMS/OSS.

The management function module is configured to perform unified management on the SRU/RU, the transmission link between the SCU and the SRU/RU (including the transmission unit in the SCU and a transmission unit in the SRU/RU).

The transmission unit of the SCU has an OM interface, where the OM interface is used to perform management communication with the SRU/RU and the control function module of the SCU.

The transmission unit of the SRU has an OM interface, where the OM interface is used to perform management communication with the SCU and a radio unit of the SRU/RU.

The radio unit of the SRU has an OM interface, where the OM interface is used to perform management communication with the SCU and the transmission unit of the SRU/RU.

An operation and maintenance method for this solution is described as follows:

The SoftSite base station/SCU provides a unified management interface for the EMS/OSS, and the EMS/OSS considers the SoftSite base station as one base station and performs unified management on the SoftSite base station.

For ease of understanding, an example is used in the following: The unified management interface may be an SNMP, Web, Telnet, or private interface, or the like, or may be various combinations of an SNMP, Web, Telnet, and private interface, which is not limited herein.

A method for performing unified management on the SRU/RU by the SCU is as follows:

Management on a radio unit 110 of the SRU/RU: A control function module 230 of the SCU performs unified management on the radio unit 110 of the SRU/RU.

In this way, the control function module 230 of the SCU may perform unified management on small-cell base stations of various types and various standards.

Management on a transmission unit 220 of the SCU: The control function module 230 of the SCU manages the transmission unit 220 in the SCU, and the SCU manages the transmission unit 220 of the SCU as a transmission board/transmission interface of the SCU: The SCU uses a management object to represent the transmission unit 220 of the SCU, so as to manage the transmission unit 220 of the SCU.

For ease of understanding, an example is used in the following:

For Ethernet, the transmission unit of the SCU is a transmission interface of the SCU.

In this case, the control function module 230 of the SCU performs unified management on the transmission interface of the SCU.

For wireless transmission, the transmission unit of the SCU is a wireless transmission hub module. For example, for a WiFi wireless backhaul, the wireless transmission hub module is a WiFi bridge.

In this case, the control function module 230 of the SCU performs unified management on the WiFi bridge.

Management on a Transmission Unit 120 of the SRU/RU:

The transmission unit 220 of the SCU manages the transmission unit 120 of the SRU/RU, and the transmission unit 220 of the SCU may use an automatic management protocol between the SCU and the SRU/RU to manage the transmission unit 120 of the SRU/RU.

For ease of understanding, an example is used in the following:

For a GPON network, the transmission unit of the SRU/RU is a GPON ONU, and the transmission unit of the SCU is a mini GPON OLT.

In this case, the control function module 230 of the SCU performs unified management on the mini GPON OLT and the radio unit 110 of the SRU/RU. The mini GPON OLT manages the GPON ONU.

For an xDSL network, the transmission unit of the SRU/RU is an xDSL CPE, and the transmission unit of the SCU is a mini xDSL DSLAM.

In this case, the control function module 230 of the SCU performs unified management on the mini xDSL DSLAM and the radio unit 110 of the SRU/RU. The mini xDSL DSLAM manages the xDSL CPE.

For the wireless transmission, the transmission unit of the SRU/RU is a remote wireless transmission module, and the transmission unit of the SCU is a wireless transmission hub module.

For example, for a TDD wireless backhaul, the remote wireless transmission module is a TDD remote node, and the wireless transmission hub module is a TDD base station.

In this case, the control function module 230 of the SCU performs unified management on the wireless transmission hub module and the radio unit 110 of the SRU/RU. The wireless transmission hub module manages the remote wireless transmission module.

Alternatively, the radio unit 110 of the SRU/RU directly manages the transmission unit 120 of the SRU/RU. The SRU/RU manages the transmission unit 120 of the SRU/RU as the transmission board/transmission interface of the SRU/RU: The SRU/RU uses one management object to represent the transmission unit 120 of the SRU/RU, so as to manage the transmission unit 120 of the SRU/RU.

For ease of understanding, an example is used in the following:

For Ethernet, the transmission unit of the SRU/RU is the transmission interface of the SRU/RU.

In this case, the radio unit 110 of the SRU/RU manages the transmission interface of the SRU/RU.

For the wireless transmission, the transmission unit of the SRU/RU is the remote wireless transmission module. For example, for the WiFi wireless backhaul, the remote wireless transmission module is a WiFi AP.

In this case, the WiFi AP may be integrated into the radio unit 110 of the SRU/RU, and the radio unit 110 of the SRU/RU performs unified management on the WiFi AP.

Figure 8:
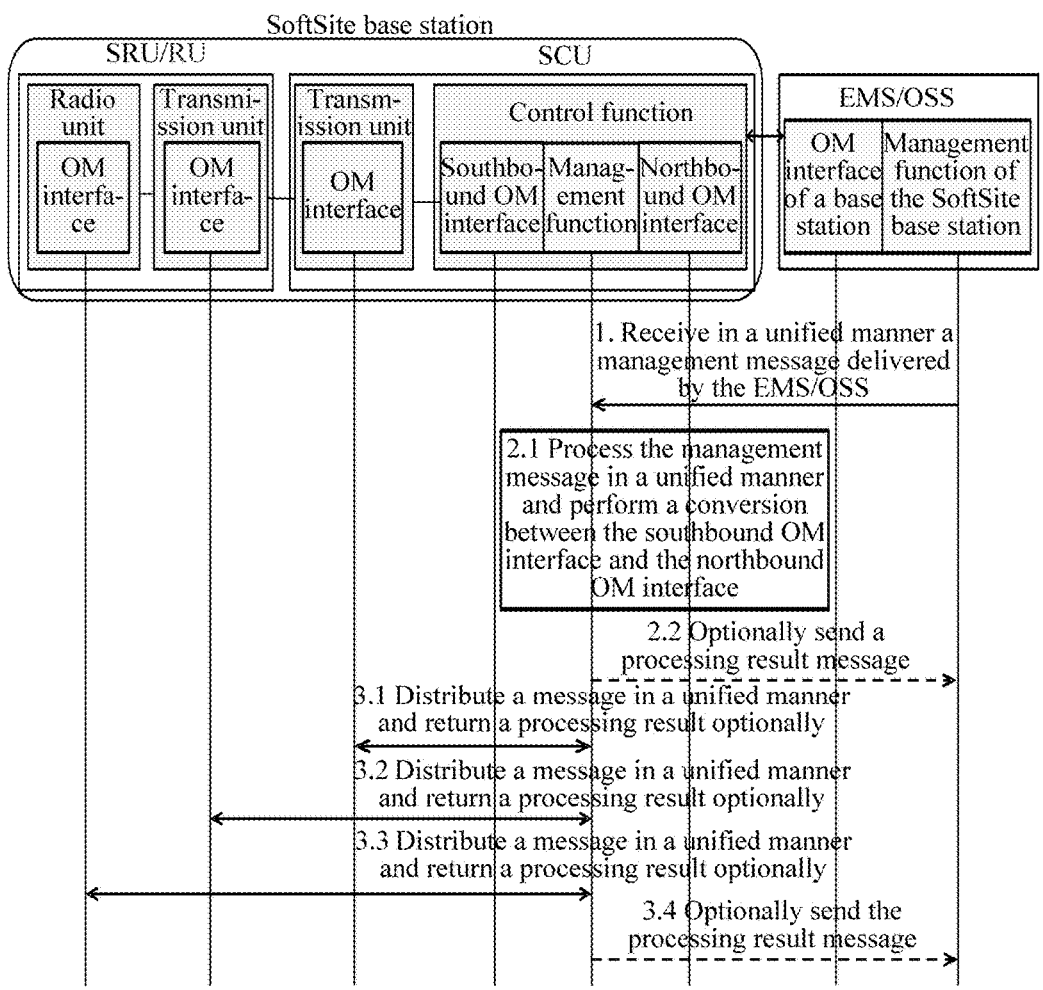
FIG. 8 is a schematic diagram of an embodiment of a communications system according to an embodiment.

Referring to FIG. 8, a method for processing, by the SCU, a management message delivered by the EMS/OSS is as follows:

Step 1: The SCU receives in a unified manner the management message delivered by the EMS/OSS.

The SoftSite base station provides a unified management interface for the EMS/OSS, that is, a unified northbound OM interface. The SoftSite base station processes and receives in a unified manner, by using the unified management interface, the management message that is delivered by the EMS/OSS to each managed function module (the radio unit and the transmission unit of the SRU/RU, and the transmission unit and the control unit of the SCU).

Step 2.1: The SCU processes the received management message in a unified manner and optionally performs a conversion between the southbound OM interface and the northbound OM interface.

After receiving the management message, the northbound OM interface then forwards the management message to the management function module of the SCU.

Step 2.2: Optionally, send a processing result message to the EMS/OSS.

The management function module in the SCU processes the message in a unified manner. The management message may be directly processed in the SCU, and then optionally the processing result message is sent to the EMS/OSS. For the management message, a management message may further need to be sent to each managed function module for processing. The management message sent herein may be the delivered management message formerly received, or may be a management message newly generated according to the processing result.

For a management message that is received from the northbound OM interface and needs to be forwarded, the management function module in the SCU sends the management message to the southbound OM interface in the SCU. The management function module in the SCU implements a conversion of the management message between the northbound OM interface and the southbound OM interface.

Step 3.1-3.4: Optionally, the SCU sends the processing result message to the EMS/OSS.

The SCU then distributes in a unified manner, by using the southbound OM interface, the management message to a corresponding to-be-managed function module. The to-be-managed function module may be one or more function modules of the radio unit and the transmission unit of the SRU/RU, and the transmission unit and the control unit of the SCU. Optionally, the SCU sends the processing result message to the EMS/OSS.

Figure 9:
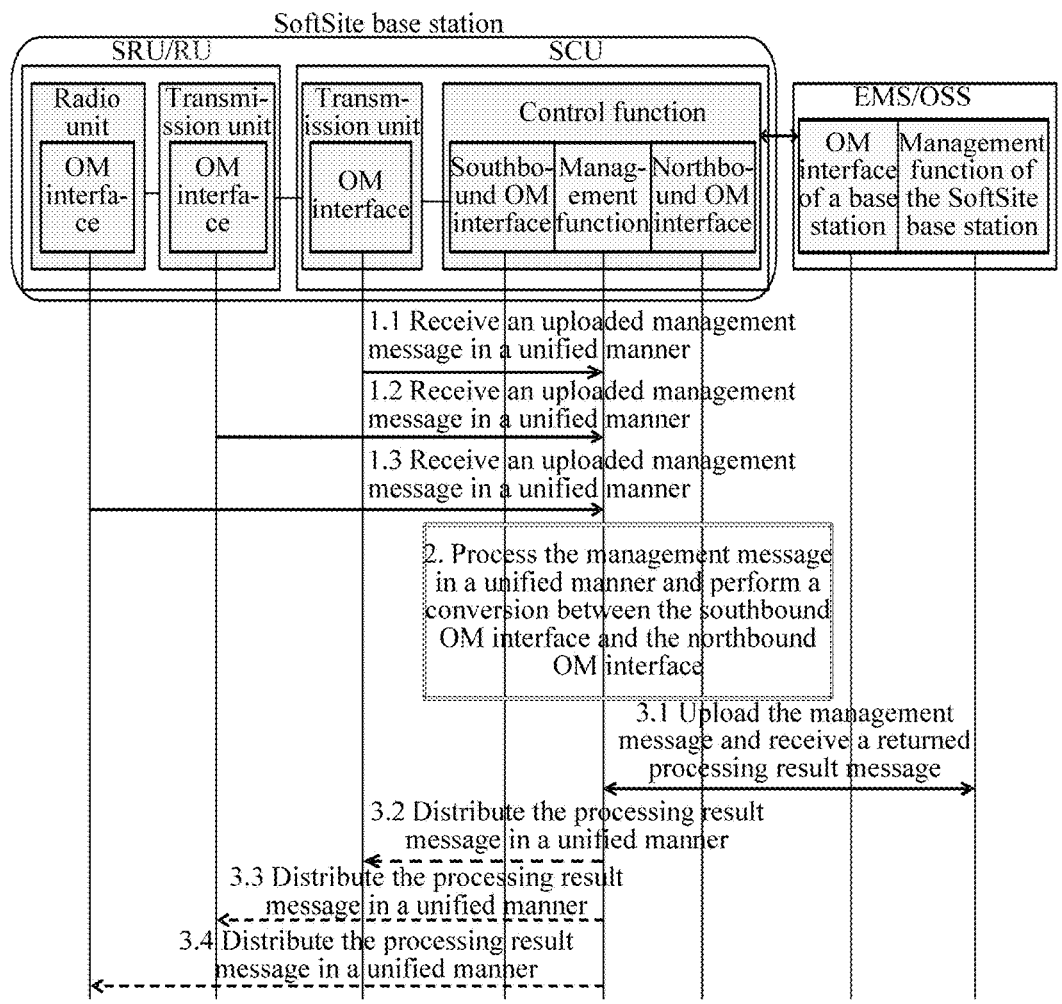
FIG. 9 is a schematic diagram of an embodiment of a communications system according to an embodiment.

Referring to FIG. 9, a method for processing, by the SCU, a management message uploaded by each managed function module is as follows:

Step 1.1-1.3: The SCU receives in a unified manner the management message uploaded by each managed function module (the radio unit and the transmission unit of the SRU/RU, and the transmission unit and the control unit of the SCU).

The southbound OM interface in the SCU receives in a unified manner the management message uploaded by each managed function module, where the management message may be a management message uploaded by one or more function modules of the radio unit and the transmission unit of the SRU/RU, and the transmission unit and the control unit of the SCU.

The SCU processes in a unified manner the management message uploaded by each managed function module; and then forwards the management message to the EMS/OSS, or directly processes the management message inside the SCU itself and does not forward the management message to the EMS/OSS.

Step 2: The SCU processes in a unified manner the uploaded management message received and optionally performs a conversion between the southbound OM interface and the northbound OM interface.

After receiving the management message, the southbound OM interface then forwards the management message to the management function module of the SCU.

The management function module in the SCU processes the message in a unified manner. The management message may be directly processed in the SCU, and then optionally a processing result message is sent to each managed function module. For the management message, a management message may further need to be sent to the EMS/OSS for processing. The management message sent herein may be the uploaded management message formerly received, or may be a management message newly generated according to the processing result.

For a management message that is received from the southbound OM interface and needs to be forwarded, the management function module in the SCU sends the management message to the northbound OM interface in the SCU. The management function module in the SCU implements the conversion of the management message between the southbound OM interface and the northbound OM interface.

For a management message uploaded by the SCU to the EMS/OSS, the SCU receives a processing result message returned from the EMS/OSS and optionally distributes in a unified manner the processing result message to a corresponding to-be-managed function module.

Step 3.2-3.4: The SCU then distributes in a unified manner, by using the southbound OM interface, the processing result message to the corresponding to-be-managed function module. The to-be-managed function module may be one or more function modules of the radio unit and the transmission unit of the SRU/RU, and the transmission unit and the control unit of the SCU.

Figure 10:
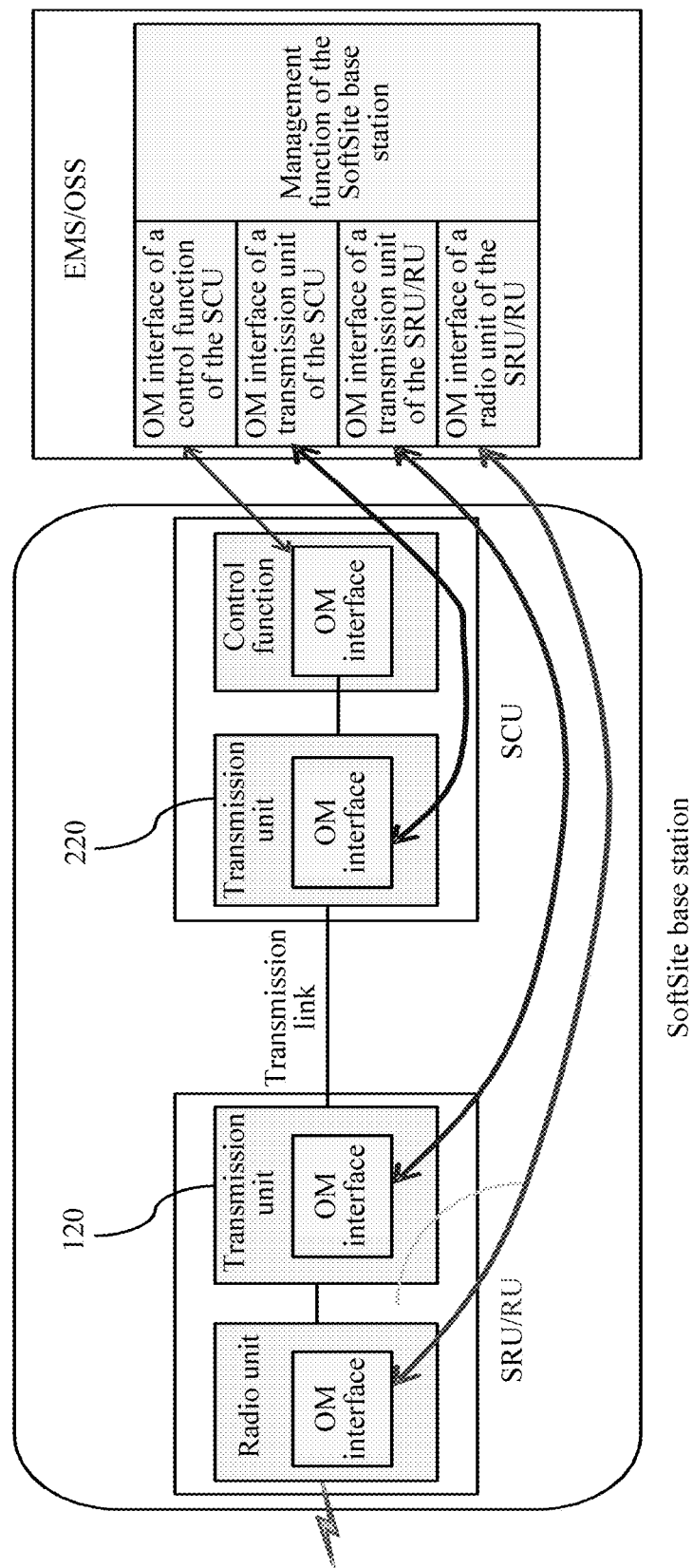
FIG. 10 is a schematic diagram of another embodiment of a communications system according to an embodiment.

Referring to FIG. 10, in another embodiment of the communications system provided in this embodiment, an EMS/OSS-dominant solution is as follows: The inside of the EMS/OSS separately manages an SCU, an SRU/RU, a transmission link between the SCU and the SRU/RU, and then management by the EMS/OSS is presented as unified management to the outside.

An interface between each function module in this solution is described as follows:

The EMS/OSS has a management interface between a management function module of a SoftSite base station and each managed function module.

The management function module of the SoftSite base station provides an operation, maintenance, and management function for the SoftSite base station, such as configuration management, performance management, fault management, and software management.

The management interface of each managed function module (an OM interface of a control function of the SCU, an OM interface of a transmission unit of the SCU, an OM interface of a transmission unit of the SRU/RU, and an OM interface of a radio unit of the SRU/RU) is used for management communication between the management function module of the SoftSite base station and the SoftSite base station, and the management function module of the SoftSite base station performs operation, maintenance, and management on the SoftSite base station by using the management interface of each managed function module.

A control function module of the SCU has an OM interface, which is used to perform management communication with the EMS/OSS, so as to implement a management function.

The transmission unit of the SCU has an OM interface, where the OM interface is used to perform management communication with the EMS/OSS, so as to implement a management function.

The transmission unit of the SRU has an OM interface, where the OM interface is used to perform management communication with the EMS/OSS, so as to implement a management function.

The radio unit of the SRU has an OM interface, where the OM interface is used to perform management communication with the EMS/OSS, so as to implement a management function.

Each managed function module of the SoftSite base station separately provides the management interface for the EMS/OSS.

Each managed function module includes the radio unit of the SRU/RU, the transmission unit of the SRU/RU, the transmission unit of the SCU, and the control function module of the SCU.

The management interface provided by each managed function module includes the OM interface of the radio unit of the SRU/RU, the OM interface of the transmission unit of the SRU/RU, the OM interface of the transmission unit of the SCU, and the OM interface of the control function of the SCU.

The EMS/OSS performs an interconnection to the OM interface of each managed function module by separately using corresponding management interfaces.

The corresponding management interfaces separately are the OM interface of the radio unit of the SRU/RU, the OM interface of the transmission unit of the SRU/RU, the OM interface of the transmission unit of the SCU, and the OM interface of the control function of the SCU.

For ease of understanding, an example is used in the following: The management interface provided by each managed function module and the corresponding management interfaces of the EMS/OSS may be an SNMP, Web, Telnet, or private interface, or the like, or may be various combinations of the SNMP, Web, Telnet, and private interface, which is not limited herein.

Each managed function module of the SoftSite base station is separately managed by the EMS/OSS.

Each managed function module of the SoftSite base station is managed by the EMS/OSS by using each management interface provided for the EMS/OSS.

Figure 11:
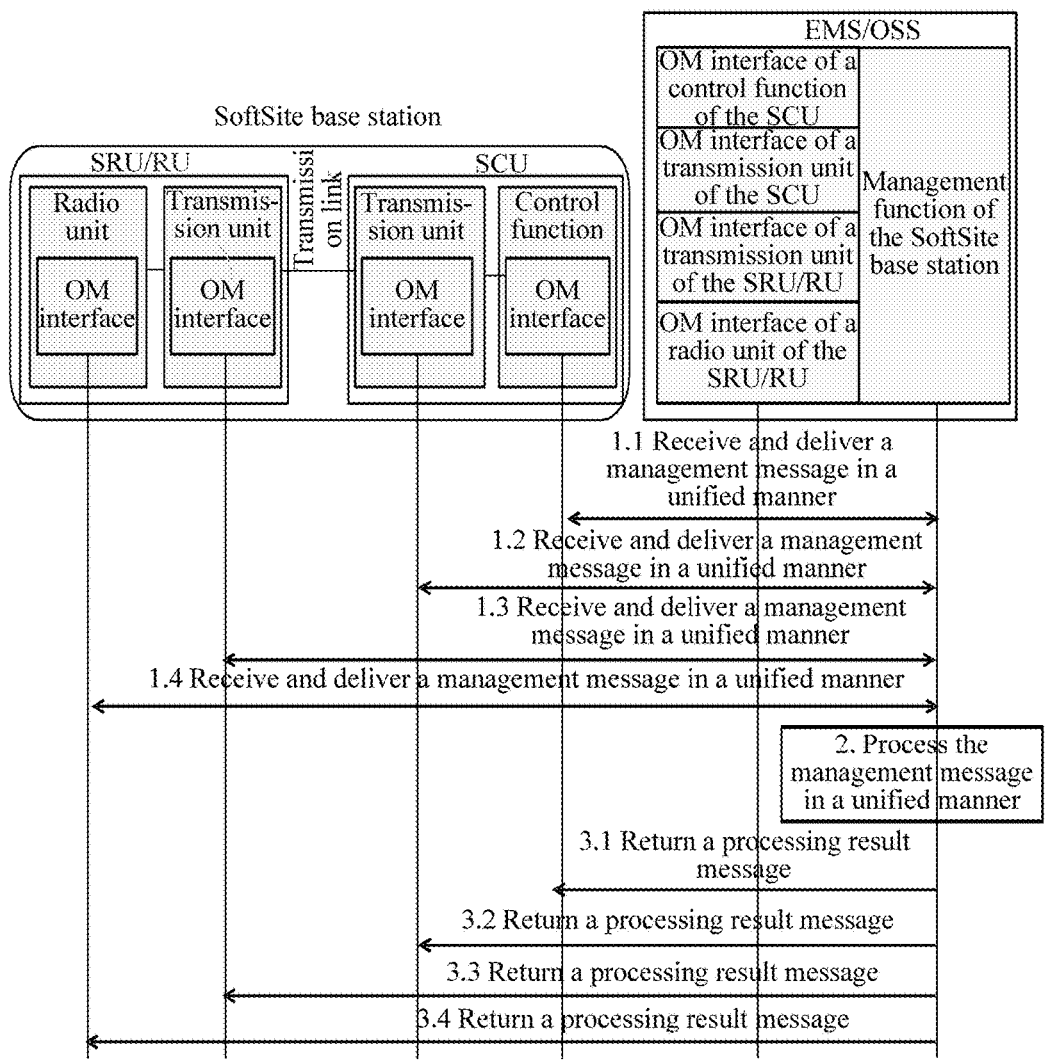
FIG. 11 is a schematic diagram of another embodiment of a communications system according to an embodiment.

Referring to FIG. 11, a method for processing a management message delivered by the EMS/OSS and a management message uploaded by each managed function module includes the following steps:

Step 1.1 to 1.4: The EMS/OSS receives and delivers in a unified manner the management message of each managed function module (the radio unit and the transmission unit of the SRU/RU, and the transmission unit and the control unit of the SCU).

Step 2: The EMS/OSS processes the received management message in a unified manner, and each managed function module is viewed inside the EMS/OSS.

Step 3.1 to 3.4: The EMS/OSS returns a processing result message to each managed function module.

Figure 12:
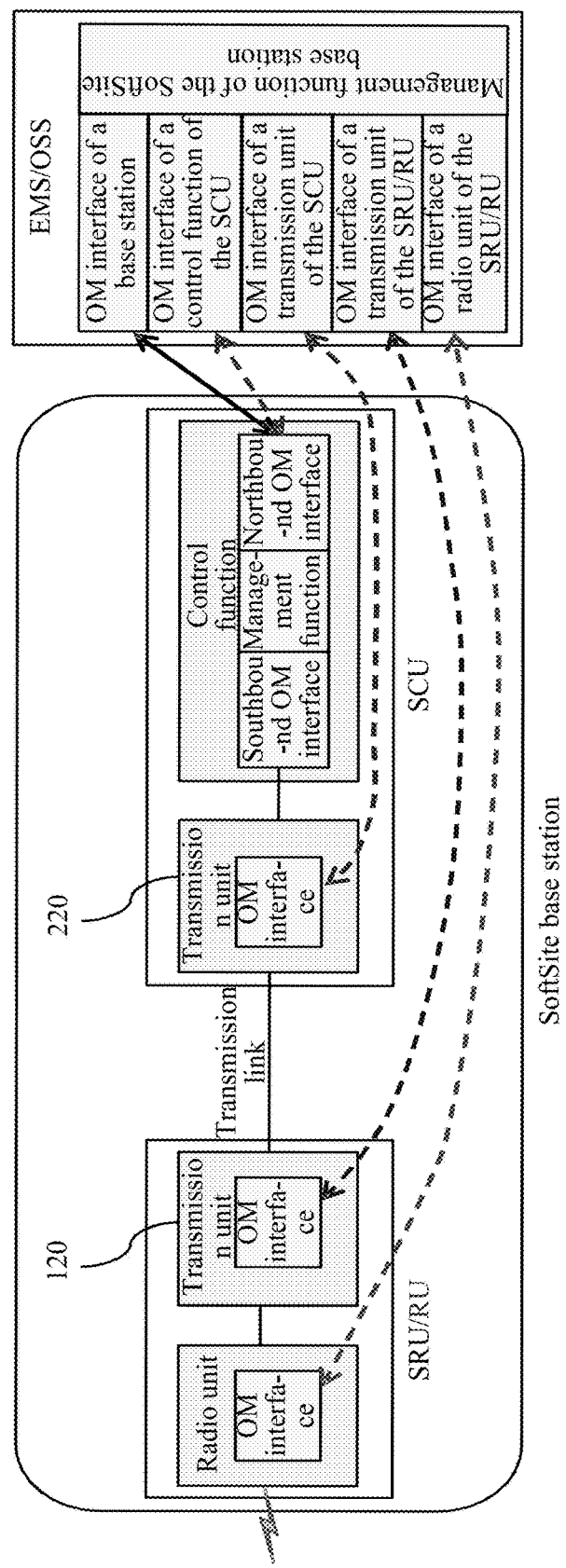
FIG. 12 is a schematic diagram of another embodiment of a communications system according to an embodiment.

Referring to FIG. 12, a combination-dominant solution of an SCU and an EMS/OSS provided in an embodiment is as follows:

The combination-dominant solution of an SCU and an EMS/OSS: For a transmission link of the SCU, a transmission link of an SRU/RU, and a transmission link between the SCU and the SRU/RU, the SCU performs unified management on a part of function modules, and the inside of the EMS/OSS separately manages another part of the function modules, and then management by the EMS/OSS is presented as unified management to the outside.

For a function of an interface of each function module in this embodiment, refer to the foregoing two embodiments for understanding, and no further details are provided herein.

For ease of understanding, an example is used in the following, and is not limited to these combinations.

The EMS/OSS performs unified management on a control function module of the SCU and a radio unit of the SRU/RU, and the EMS/OSS separately manages a transmission unit of the SCU and a transmission unit of the SRU/RU. For example, for xPON transmission, the EMS/OSS separately manages an xPON ONU and an xPON mini OLT.

The EMS/OSS performs unified management on the control function module of the SCU, the radio unit of the SRU/RU, and the transmission unit of the SRU/RU, and the EMS/OSS separately manages the transmission unit of the SCU.

In this embodiment, each function module in a SoftSite base station may be managed as a whole. Therefore, single-point management can be performed, operation and maintenance are simplified, and costs of the operation and maintenance are reduced.

Figure 13:
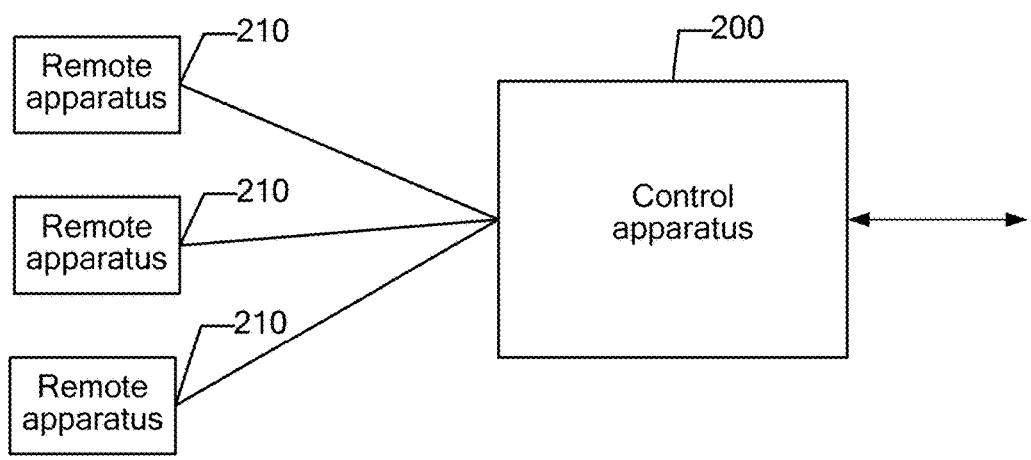
FIG. 13 is a schematic diagram of another embodiment of a communications system according to an embodiment.

Referring to FIG. 13, in an embodiment of a communications system provided in an embodiment, a control apparatus and multiple remote apparatuses are included.

The control apparatus communicates with and connects to the multiple remote apparatuses, and the control apparatus controls data aggregation and distribution of the multiple remote apparatuses, so that the control apparatus and the multiple remote apparatuses are presented as only one network element on a network management server and a gateway device that are outside the communications system.

Figure 14:
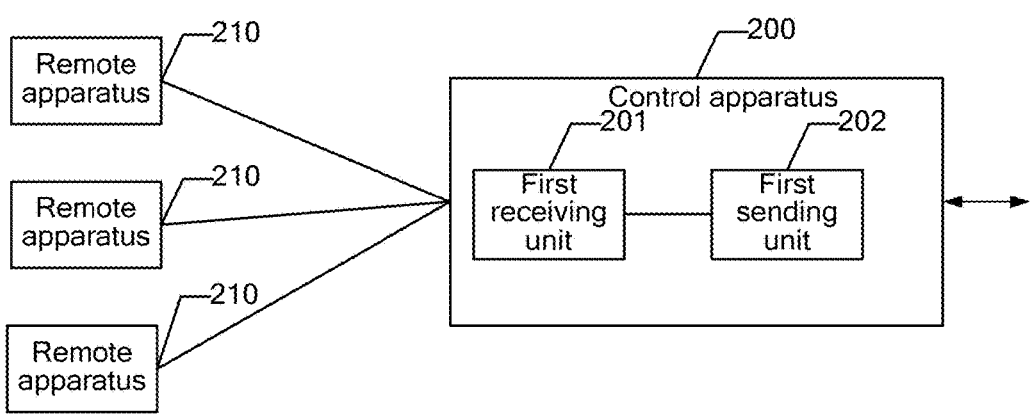
FIG. 14 is a schematic diagram of an embodiment of a control apparatus according to an embodiment.

Referring to FIG. 14, in an embodiment of the control apparatus provided in this embodiment, the control apparatus has an interface paired with the network management server, and the control apparatus has an interface paired with each of the multiple remote apparatuses.

The control apparatus 200 includes:

a first receiving unit 201, configured to receive, by using the interface paired with the network management server, management data sent by the network management server; and a first sending unit 202, configured to distribute, by using the interface paired with each of the multiple remote apparatuses, the management data received by the first receiving unit 201 to the multiple remote apparatuses.

The first receiving unit 201 is further configured to receive feedback data that is sent by the multiple remote apparatuses to the network management server by using the interface paired with each of the multiple remote apparatuses; and the first sending unit 202 is configured to send, by using the interface paired with the network management server, the feedback data and feedback data generated by the control apparatus to the network management server, so that the network management server presents the control apparatus and the multiple remote apparatuses controlled by the control apparatus as one network element.

Figure 15:
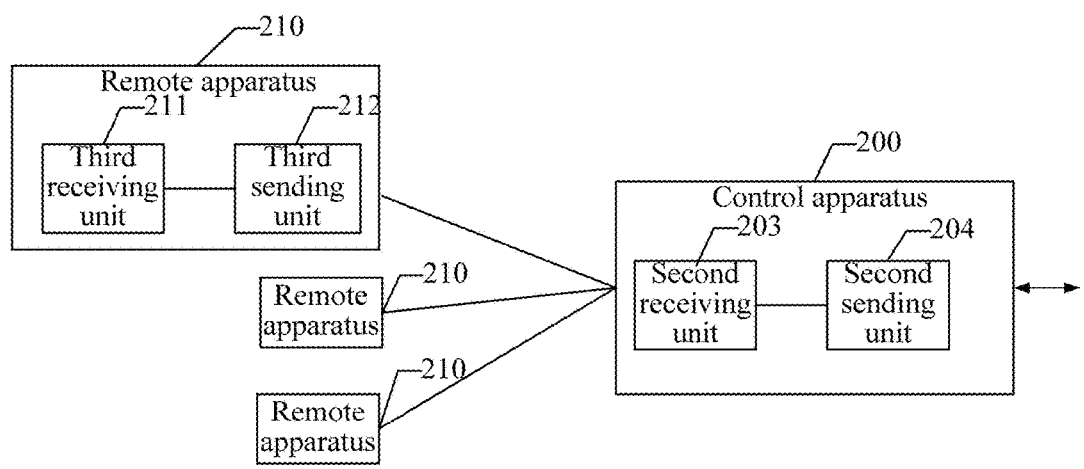
FIG. 15 is a schematic diagram of another embodiment of a control apparatus according to an embodiment.

Referring to FIG. 15, in another embodiment of the control apparatus provided in this embodiment, the control apparatus and each of the multiple remote apparatuses have an interface paired with the network management server, and the multiple remote apparatuses communicate with and connect to the network management server.

The control apparatus 200 includes:

a second receiving unit 203, configured to receive, by using the interface paired with the network management server, management data sent by the network management server; and a second sending unit 204, configured to send feedback data of the control apparatus to the network management server by using the interface paired with the network management server.

The remote apparatus includes:

a third receiving unit 211, configured to receive, by using the interface paired with the network management server, management data sent by the network management server; and a third sending unit 212, configured to send feedback data of the control apparatus to the network management server by using the interface paired with the network management server, so that the network management server presents the control apparatus and the multiple remote apparatuses controlled by the control apparatus as one network element.

In an embodiment of a network management server 30 provided in an embodiment, the network management server and a control apparatus transmit management data and feedback data according to a preset solution, so that the control apparatus and the multiple remote apparatuses are presented as only one network element of the base station on the network management server;

the control apparatus communicates with and connects to the multiple remote apparatuses, and the control apparatus controls data aggregation and distribution of the multiple remote apparatuses; and the control apparatus communicates with and connects to the network management server.

Figure 16:
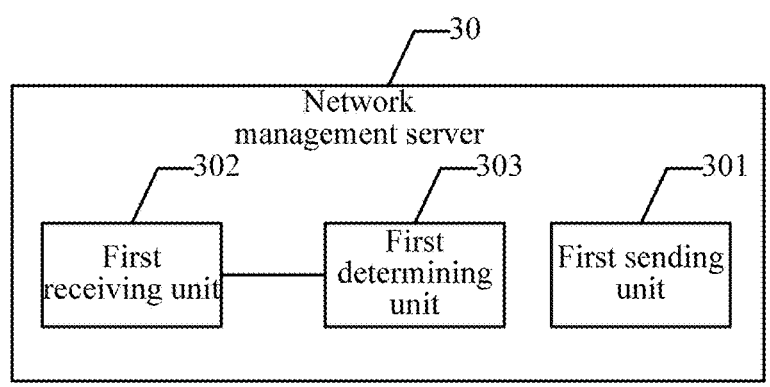
FIG. 16 is a schematic diagram of an embodiment of a network management server according to an embodiment.

Referring to FIG. 16, in another embodiment of the network management server provided in this embodiment, the control apparatus has an interface paired with the network management server.

The network management server 30 includes:

a first sending unit 301, configured to send management data to the control apparatus by using an interface paired with the control apparatus;

a first receiving unit 302, configured to receive, by using the interface paired with the control apparatus, feedback data of the multiple remote apparatuses and feedback data of the control apparatus that are sent by the control apparatus; and a first determining unit 303, configured to present the control apparatus and the multiple remote apparatuses controlled by the control apparatus as one network element.

Figure 17:
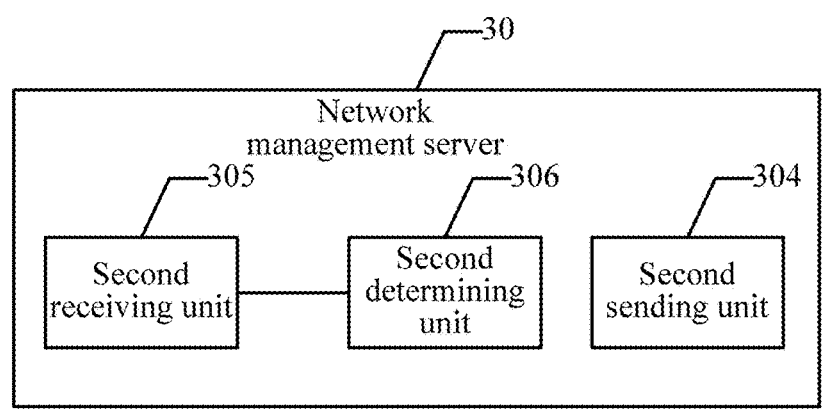
FIG. 17 is a schematic diagram of another embodiment of a network management server according to an embodiment.

Referring to FIG. 17, in another embodiment of the network management server 30 provided in this embodiment, the control apparatus and each of the multiple remote apparatuses have an interface paired with the network management server.

The network management server 30 includes:

a second sending unit 304, configured to send management data to the control apparatus by using an interface paired with the control apparatus, and send the management data to the multiple remote apparatuses by using an interface paired with each of the multiple remote apparatuses;

a second receiving unit 305, configured to receive, by using the interface paired with the control apparatus, feedback data fed back by the control apparatus, and receive, by using the interface paired with each of the multiple remote apparatuses, feedback data fed back by the multiple remote apparatuses; and a second determining unit 306, configured to present the control apparatus and the multiple remote apparatuses controlled by the control apparatus as one network element.

This embodiment further provides a computer storage medium, and a program is stored in the storage medium. When the program is being executed, a part or all of the steps performed by the foregoing control apparatus are included.

This embodiment further provides a computer storage medium, and a program is stored in the storage medium. When the program is being executed, a part or all of the steps performed by the foregoing network management server are included.

Figure 18:
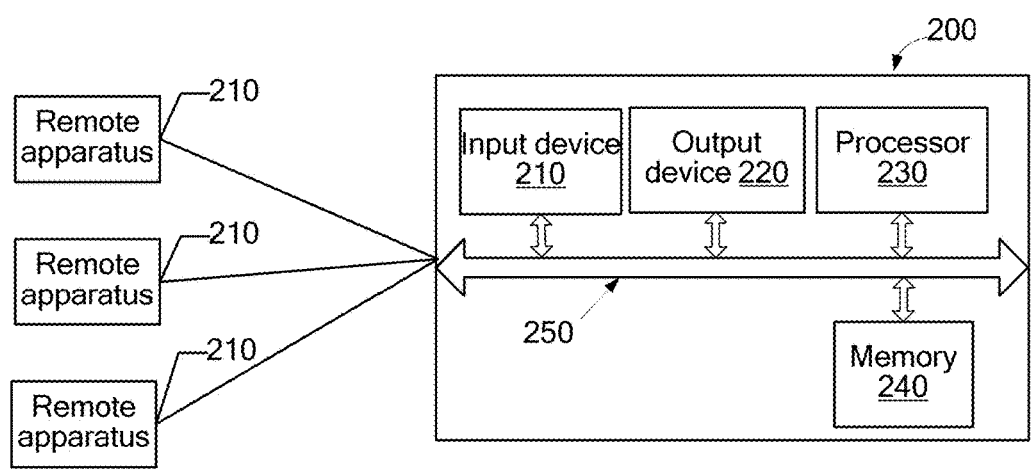
FIG. 18 is a schematic diagram of another embodiment of a control apparatus according to an embodiment.

FIG. 18 is a schematic diagram of an embodiment of a control apparatus 200 according to an embodiment. The control apparatus 200 communicates with and connects to multiple remote apparatuses 210, and the control apparatus 200 controls data aggregation and distribution of the multiple remote apparatus 210.

The control apparatus 200 communicates with and connects to the network management server 30.

The control apparatus 200 may include an input device 210, an output device 220, a processor 230, and a memory 240.

The memory 240 may include a read-only memory and a random access memory, and provides an instruction and data for the processor 230. A part of the memory 240 may further include a nonvolatile random access memory (NVRAM).

The memory 240 stores the following elements: an executable module or a data structure, a subset of an executable module or a data structure, or an extension set of an executable module or a data structure.

Operating instructions include various operating instructions, which are used to implement various operations.

An operating system includes various system programs, which are used to implement various basic services and process hardware-based tasks.

In this embodiment, the processor 230 executes the following operation by invoking an operating instruction stored in the memory 240 (the operating instruction may be stored in the operating system):

Management data and feedback data are transmitted according to a preset solution, so that the control apparatus and the multiple remote apparatuses are presented as only one network element on the network management server.

The processor 230 may also be referred to as a central processing unit (CPU). The memory 240 may include a read-only memory and a random access memory, and provides an instruction and data for the processor 230. A part of the memory 240 may further include a nonvolatile random access memory (NVRAM). In a specific application, all components of a base station 20 are coupled together by using a bus system 250, where in addition to a data bus, the bus system 250 may further include a power supply bus, a control bus, a status signal bus, and the like. However, for clarity of description, various buses are marked as the bus system 250 in the figure.

The methods disclosed in the foregoing embodiments may be applied to the processor 230, or implemented by the processor 230. The processor 230 may be an integrated circuit chip and has a signal processing capability. In an implementation process, the steps of the foregoing methods may be implemented by using an integrated logical circuit of hardware of the processor 230 or an instruction in a form of software. The foregoing processor 230 may be a universal processor, a digital signal processor (DSP), an application specific integrated circuit (ASIC), a field programmable gate array (FPGA) or another programmable logical device, a discrete gate or a transistor logical device, or a discrete hardware component, and can implement or execute the methods, the steps, and the logical block diagrams disclosed in the embodiments. The universal processor may be a microprocessor, or the processor may be any conventional processor or the like. The steps of the methods disclosed in the embodiments may be directly executed by a hardware decoding processor, or executed by a combination of hardware and a software module in a decoding processor. The software module may be located in a mature storage medium in the art, such as a random access memory, a flash memory, a read-only memory, a programmable read-only memory or an electrically erasable programmable memory, or a register. The storage medium is located in the memory 240. The processor 230 reads information from the memory 240, and implements the steps of the foregoing methods in combination with the hardware.

Figure 19:
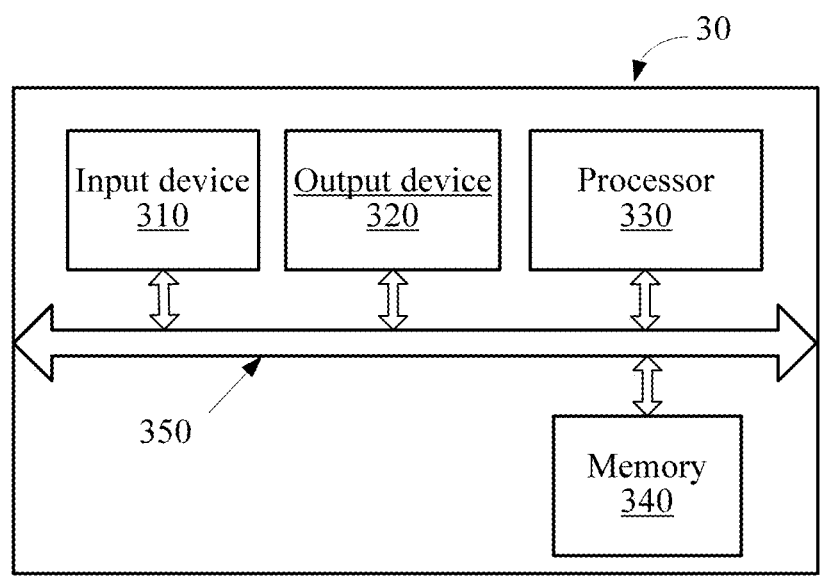
FIG. 19 is a schematic diagram of another embodiment of a network management server according to an embodiment.

FIG. 19 is a schematic structural diagram of a network management server 30 according to an embodiment. The network management server includes an input device 310, an output device 320, an processor 330, and a memory 340.

The memory 340 may include a read-only memory and a random access memory, and provides an instruction and data for the processor 330. A part of the memory 340 may further include a nonvolatile random access memory (NVRAM).

The memory 340 stores the following elements: an executable module or a data structure, a subset of an executable module or a data structure, or an extension set of an executable module or a data structure.

Operating instructions include various operating instructions, which are used to implement various operations.

An operating system includes various system programs, which are used to implement various basic services and process hardware-based tasks.

In this embodiment, the processor 330 executes the following operation by invoking an operating instruction stored in the memory 340 (the operating instruction may be stored in the operating system):

Management data is sent by using the output device 320 to a control apparatus and/or multiple remote apparatuses in a base station; feedback data sent by the control apparatus and/or the multiple remote apparatuses is received by using the input device 310; and the processor 330 is configured to present the control apparatus and the multiple remote apparatuses controlled by the control apparatus as one network element.

The processor 330 may also be referred to as a CPU. The memory 340 may include a read-only memory and a random access memory, and provides an instruction and data for the processor 330. A part of the memory 340 may further include a nonvolatile random access memory (NVRAM). In a specific application, all components of the network management server 30 are coupled together by using a bus system 350, where in addition to a data bus, the bus system 350 may further include a power supply bus, a control bus, a status signal bus, and the like. However, for clarity of description, various buses are marked as the bus system 350 in the figure.

The methods disclosed in the foregoing embodiments may be applied to the processor 330, or implemented by the processor 330. The processor 330 may be an integrated circuit chip and has a signal processing capability. In an implementation process, the steps of the foregoing methods may be implemented by using an integrated logical circuit of hardware of the processor 330 or an instruction in a form of software. The processor 330 may be a universal processor, a digital signal processor (DSP), an application specific integrated circuit (ASIC), a field programmable gate array (FPGA) or another programmable logical device, a discrete gate or a transistor logical device, or a discrete hardware component, and can implement or execute the methods, the steps, and the logical block diagrams disclosed in the embodiments. The universal processor may be a microprocessor, or the processor may be any conventional processor or the like. The steps of the methods disclosed in the embodiments may be directly executed by a hardware decoding processor, or executed by a combination of hardware and a software module in a decoding processor. The software module may be located in a mature storage medium in the art, such as a random access memory, a flash memory, a read-only memory, a programmable read-only memory or an electrically erasable programmable memory, or a register. The storage medium is located in the memory 340. The processor 330 reads information from the memory 340, and implements the steps of the foregoing methods in combination with the hardware.

Persons of ordinary skill in the art may understand that all or a part of the steps of the methods in the embodiments may be implemented by a program instructing relevant hardware. The program may be stored in a computer readable storage medium. The storage medium may include: a ROM, a RAM, a magnetic disk, or an optical disc.

The communications system, the control apparatus, and the network management server are described in detail in the embodiments. Specific examples are used in this specification to describe the principle and implementations of the disclosure. The descriptions of the foregoing embodiments are merely intended to help understand the method and idea of the disclosure. In addition, with respect to the implementations and the application scope, modifications may be made by persons of ordinary skill in the art according to the idea of the disclosure. Therefore, this specification shall not be construed as a limitation on the present embodiments.

What is claimed is:

1. A communications system, comprising:
a control apparatus;
multiple remote apparatuses; and
a network management server;
wherein the control apparatus communicates with the multiple remote apparatuses, and wherein the control apparatus controls data aggregation of outgoing data from the multiple remote apparatuses and further controls distribution of incoming data to the multiple remote apparatuses;
wherein the control apparatus is configured to communicate with the network management server; and
wherein the network management server and the control apparatus are configured to transmit management data and feedback data according to a preset solution and using a unified interface, so that the control apparatus and the multiple remote apparatuses are presented as only one network element to the network management server.

2. The system according to claim 1, wherein coverage ranges of the multiple remote apparatuses are different in size, wherein a remote apparatus with a coverage range greater than or equal to a specified value in the multiple remote apparatuses is configured to provide a coverage range of a large cell, and wherein a remote apparatus with a coverage range less than the specified value in the multiple remote apparatuses is configured to provide a coverage range of a small cell;
wherein the large cell is a cell with a signal range greater than or equal to the specified value; and
wherein the small cell is a cell with a signal range less than the specified value.

3. The system according to claim 1, wherein the control apparatus has an interface paired with the network management server, and the control apparatus has an interface paired with each of the multiple remote apparatuses; and
wherein the network management server and the control apparatus transmitting management data and feedback data according to a preset solution comprises:
the control apparatus receiving, by using the interface paired with the network management server, management data sent by the network management server, and distributing the management data to the multiple remote apparatuses by using the interface paired with each of the multiple remote apparatuses;
the control apparatus receiving, by using the interface paired with each of the multiple remote apparatuses, feedback data that is sent by the multiple remote apparatuses to the network management server; and
sending, by using the interface paired with the network management server, the feedback data and feedback data generated by the control apparatus to the network management server, so that the network management server presents the control apparatus and the multiple remote apparatuses controlled by the control apparatus as one network element.

4. The system according to claim 1, wherein the control apparatus and each of the multiple remote apparatuses have an interface paired with the network management server, and the multiple remote apparatuses communicate with the network management server; and
wherein that the network management server and the control apparatus transmitting management data and feedback data according to a preset solution comprises:
the network management server sending management data to the control apparatus by using an interface paired with the control apparatus, and receiving, by using the interface paired with the control apparatus, feedback data fed back by the control apparatus;
the network management server separately sending management data to the multiple remote apparatuses by separately using an interface paired with each of the multiple remote apparatuses, and receiving, by using the interface paired with each of the multiple remote apparatuses, feedback data fed back by the multiple remote apparatuses; and
the network management server presenting the control apparatus and the multiple remote apparatuses controlled by the control apparatus as one network element.

5. The system according to claim 1, wherein the control apparatus has an interface paired with the network management server, and each of a part of the multiple remote apparatuses has an interface paired with the network management server, wherein the part of the remote apparatuses communicate with the network management server;
wherein that the network management server and the control apparatus transmit management data and feedback data according to a preset solution comprises:

the control apparatus receiving, by using the interface paired with the network management server, management data sent by the network management server;

distributing the management data to a remote apparatus that is in the multiple remote apparatuses and has no interface paired with the network management server;

receiving feedback data sent by the remote apparatus that has no interface paired with the network management server;

sending, by using the interface paired with the network management server, the feedback data and feedback data generated by the control apparatus to the network management server;

the network management server separately sending the management data to the part of the remote apparatuses by separately using an interface paired with each of the part of the remote apparatuses;

receiving, by using the interface paired with each of the part of the remote apparatuses, feedback data fed back by the part of the remote apparatuses; and the network management server presenting the control apparatus and the multiple remote apparatuses controlled by the control apparatus as one network element.

6. The system according to claim 5, wherein a remote apparatus that provides a small cell and is in the multiple remote apparatuses is arranged in a coverage range of a large cell or on an edge of a coverage range of a large cell.

7. The system according to claim 1, wherein a radio access network (RAN) interface is used by the control apparatus and the multiple remote apparatuses, and wherein the RAN interface comprises an Si interface, an X2 interface, an Iub interface, an Abis interface, and a WiFi Capwap interface.

8. The system according to claim 1, wherein data transmitted between the control apparatus and the multiple remote apparatuses is transmitted over a transmission link which is based on at least one of Ethernet, Internet Protocol (IP), or Multiprotocol Label Switching (MPLS).

9. The system according to claim 1, wherein a number of remote apparatuses in a base station can be dynamically deployed according to a network capacity requirement.

10. The system according to claim 1, wherein the control apparatus is configured to manage the multiple remote apparatuses and transmission links between the control apparatus and the multiple remote apparatuses, and is further configured to communicate with the network management server.

11. The system according to claim 1, wherein the control apparatus is one of an independent baseband unit or a baseband unit in a macro base station.

12. The system according to claim 1, wherein the control apparatus supports an Ethernet, Internet protocol (IP), or Multiprotocol Label Switching (MPLS) interface, and further supports multiple transmission technologies, wherein the multiple transmission technologies comprise wired transmission and wireless transmission.

13. The system according to claim 12, wherein the wired transmission comprises an x passive optical network (xPON), an x digital subscriber line (xDSL), Ethernet, an optical fiber, and a cable television network; and wherein the wireless transmission comprises microwave in a conventional frequency band, V-Band, E-Band, Sub 6 GHz, Wireless Fidelity (WiFi), television (TV) white spaces, and time division duplex (TDD) backhaul.

14. The system according to claim 1, wherein the remote apparatus is a small-cell base station selected from at least one of: Metrocell, Micro, Pico, Femto, and WiFi access point (AP).

15. The system according to claim 1, wherein the control apparatus and the remote apparatus are of a single standard or in multi-mode;

wherein the single standard comprises one of a Global System for Mobile Communications (GSM), a Universal Mobile Telecommunications System (UMTS), Long Term Evolution (LTE), and WiFi; and wherein the multi-mode is a combination of single standards, wherein the combination of the single standards comprises at least two of the following: GSM, UMTS, WiFi, and LTE.

16. The system according to claim 1, wherein the remote apparatus supports an Ethernet, Internet protocol (IP), or Multiprotocol Label Switching (MPLS) interface, and further supports multiple transmission technologies, wherein the multiple transmission technologies comprise wired transmission and wireless transmission.

17. The system according to claim 1, wherein the control apparatus discovers, by using a Dynamic Host Configuration Protocol (DHCP) of address autoconfiguration, a remote apparatus connected to the control apparatus.

18. The system according to claim 1, wherein the control apparatus queries the remote apparatus by using pre-configured information about remote apparatuses associated with the control apparatus.

19. The system according to claim 1, wherein the control apparatus obtains configuration information of the multiple remote apparatuses from the network management server and performs configuration for the multiple remote apparatuses.

20. The system according to claim 1, wherein the control apparatus has at least one of a data proxy function or a data gateway function.

21. The system according to claim 1, wherein the communications system further comprises a gateway device, wherein:

the control apparatus is configured to receive uplink data that is sent by the multiple remote apparatuses to the gateway device, and send the uplink data to the gateway device by using an interface paired with the gateway device; and wherein the control apparatus is configured to receive, by using the interface, downlink data sent by the gateway device, and distribute the downlink data to the multiple remote apparatuses, so that the control apparatus and the multiple remote apparatuses are presented as only one network element on the gateway device.

* * * * *